(12) United States Patent
Takata

(10) Patent No.: US 8,094,242 B2
(45) Date of Patent: Jan. 10, 2012

(54) OBJECT MANAGEMENT APPARATUS, MOBILE TERMINAL, AND OBJECT MANAGEMENT METHOD

(75) Inventor: Hiroaki Takata, Ishikawa (JP)

(73) Assignee: PFU Limited, Ishikawa (JP)

( * ) Notice: Subject to any disclaimer, the term of this patent is extended or adjusted under 35 U.S.C. 154(b) by 450 days.

(21) Appl. No.: 12/432,059

(22) Filed: Apr. 29, 2009

(65) Prior Publication Data

US 2009/0290014 A1    Nov. 26, 2009

(30) Foreign Application Priority Data

May 23, 2008  (JP) .................................. 2008-135831

(51) Int. Cl.
*H04N 5/74* (2006.01)
(52) U.S. Cl. ........ 348/756; 348/130; 348/141; 348/142; 348/758; 348/552
(58) Field of Classification Search .................. 348/130, 348/141, 142, 756, 758, 552
See application file for complete search history.

(56) References Cited

U.S. PATENT DOCUMENTS

| | | | | |
|---|---|---|---|---|
| 6,983,431 | B2 * | 1/2006 | Donelly et al. | 716/122 |
| 2004/0225971 | A1 * | 11/2004 | Donelly et al. | 716/2 |
| 2008/0221968 | A1 * | 9/2008 | Gaffney et al. | 705/10 |

FOREIGN PATENT DOCUMENTS

JP         2001-136504 A     5/2001

* cited by examiner

*Primary Examiner* — Djenane Bayard
(74) *Attorney, Agent, or Firm* — Lowe, Hauptman, Ham & Berner, LLP

(57) ABSTRACT

An object management apparatus comprising an image photographing unit, a storage unit, and a control unit communicably connected to at least one operation target device and a mobile terminal including a displacement detecting unit that detects a displacement of a physical quantity caused when the mobile terminal moves and a display unit via a network, wherein the storage unit includes, a display object storing unit, an operation target object storing unit, and a processing command storing unit, and the control unit includes, a display object transmitting unit, a mobile terminal position acquiring unit, an region determining unit, an operation target object determining unit, a processing command determining physical quantity displacement receiving unit, a display object acquiring unit, a processing command searching unit, and a processing command executing unit.

24 Claims, 11 Drawing Sheets

OBJECT MANAGEMENT APPARATUS, MOBILE TERMINAL, AND OBJECT MANAGEMENT METHOD

RELATED APPLICATIONS

The present application is based on, and claims priority from, Japan Application Number 2008-135831, filed May 23, 2008, the disclosure of which is hereby incorporated by reference herein in its entirety.

BACKGROUND OF THE INVENTION

1. Field of the Invention

The present invention relates to an object management apparatus, a mobile terminal, and an object management method.

2. Description of the Related Art

Conventionally, in paperwork operations such as office work using a PC, paperwork is done by an operation being performed by a user to drag an icon or the like indicating processing data such as an electronic file and image data on the desktop of the PC using an input unit such as a mouse and to drop the icon onto an object such as an icon indicating an operation target device such as a FAX, file, PC, tray, and shredder. In recent years, a technology to do paperwork efficiently using such operation target devices is called for and technologies to operate operation target devices in a virtual space are reported.

In an information input/output system in JP-A-2001-136504, for example, the desktop is virtually integrated as a shared work plane by generating a virtual object corresponding to an operation target device such as a mobile computer, installed computer, and computer peripheral (for example, a printer, display, and scanner) and projecting the generated object on a wall, table and the like in a conference room and the like. Accordingly, the user exchanges data among a plurality of users by dragging processing data such as an electronic file and image data and dropping the processing data on an object using the mouse.

However, a conventional information input/output system (JP-A-2001-136504 and the like) has a problem that it becomes necessary to prepare devices for generating and projecting an object and a work plane for projection, leading to expansion of a facility itself. A conventional information input/output system also has a problem that it is necessary to generate a virtual object and to construct a virtual integrated desktop by projecting the generated object on a wall, table or the like, requiring a time to prepare a work space. In addition, a conventional information input/output system has a problem that a user operation recognition result cannot be determined and executed in real time because a user operation (for example, a drag-and-drop operation) on an object is recognized by detecting a change in position of the object on the work plane for projection by a plurality of cameras installed in the apparatus and several seconds are needed due to a heavy load of user operation recognition processing.

SUMMARY OF THE INVENTION

It is an object of the present invention to at least partially solve the problems in the conventional technology.

An object management apparatus according to one aspect of the present invention includes an image photographing unit, a storage unit, and a control unit. The object management apparatus is communicably connected to at least one operation target device and a mobile terminal including a displacement detecting unit that detects a displacement of a physical quantity caused when the mobile terminal moves and a display unit via a network, wherein the storage unit includes a display object storing unit that stores a display object corresponding to processing data, an operation target object storing unit that associates and stores an operation target object corresponding to the operation target device and a specific region on a work plane where the operation target object is present, and a processing command storing unit that associates and stores position information of the mobile terminal, the displacement of the physical quantity of the mobile terminal, and a processing command for specifying processing to be performed on the operation target device using the display object, and the control unit includes a display object transmitting unit that transmits the display object stored in the display object storing unit to the mobile terminal to cause the display unit to display the display object, a mobile terminal position acquiring unit that acquires the position information of the mobile terminal on the work plane by comparing a first image on the work plane photographed by the image photographing unit and in which the operation target object is displayed in the specific region and a second image in which the mobile terminal is displayed on the work plane, an region determining unit that determines whether the position information is included in the specific region by comparing the position information of the mobile terminal acquired by the mobile terminal position acquiring unit and the specific region of the operation target object stored in the operation target object storing unit, an operation target object determining unit that determines the operation target object associated with the specific region from the operation target object storing unit when the region determining unit determines that the position information is included in the specific region, a processing command determining physical quantity displacement receiving unit that receives the displacement of the physical quantity detected by the displacement detecting unit of the mobile terminal from the mobile terminal after the operation target object being determined by the operation target object determining unit, a display object acquiring unit that acquires the display object transmitted to the mobile terminal by the display object transmitting unit and displayed on the display unit from the display object storing unit when the displacement of the physical quantity is received by the processing command determining physical quantity displacement receiving unit, a processing command searching unit that searches for the processing command associated with the position information and the displacement of the physical quantity from the processing command storing unit using the position information of the mobile terminal acquired by the mobile terminal position acquiring unit and the displacement of the physical quantity received by the processing command determining physical quantity displacement receiving unit as search keys, and a processing command executing unit that causes the operation target device corresponding to the operation target object determined by the operation target object determining unit to execute the processing command searched for by the processing command searching unit using the display object acquired by the display object acquiring unit.

A mobile terminal according to another aspect of the present invention communicably connected to at least one operation target device and an object management apparatus via a network. The mobile terminal includes a displacement detecting unit that detects a displacement of a physical quantity caused when the mobile terminal moves, a display unit, an image photographing unit, a storage unit, and a control unit, wherein the storage unit includes a display object storing unit that stores a display object corresponding to processing data, an operation target object storing unit that stores an operation target object corresponding to the operation target device, and a processing command storing unit that associates and stores the operation target object, the displacement of the physical quantity of the mobile terminal, and a processing command for specifying processing to be performed on the operation target device using the display object, and the control unit includes a display object displaying unit that displays the display object stored in the display object storing unit on the display unit, an operation target object extracting unit that extracts, based on at least a portion of images on a work plane photographed by the image photographing unit and in which the operation target object is displayed in the specific region, the operation target object in the images, a matching determining unit that determines whether two operation target objects match by comparing the operation target object extracted by the operation target object extracting unit and the operation target object stored in the operation target object storing unit, an operation target object determining unit that determines the matched operation target object from the operation target object storing unit after being determined by the matching determining unit that the two operation target objects match, a processing command determining physical quantity displacement detecting unit that detects the displacement of the physical quantity by the displacement detecting unit after the operation target object being determined by the operation target object determining unit, a display object acquiring unit that acquires the display object displayed on the display unit by the display object displaying unit from the display object storing unit when the displacement of the physical quantity is detected by the processing command determining physical quantity displacement detecting unit, a processing command searching unit that searches for the processing command associated with the operation target object and the displacement of the physical quantity from the processing command storing unit using the operation target object determined by the operation target object determining unit and the displacement of the physical quantity detected by the processing command determining physical quantity displacement detecting unit as search keys, and a processing command executing unit that causes the operation target device corresponding to the operation target object determined by the operation target object determining unit to execute the processing command searched for by the processing command searching unit using the display object acquired by the display object acquiring unit.

An object management method according to still another aspect of the present invention executed by an object management apparatus including an image photographing unit, a storage unit, and a control unit communicably connected to at least one operation target device and a mobile terminal via a network. The mobile terminal includes a displacement detecting unit that detects a displacement of a physical quantity caused when the mobile terminal moves and a display unit. In the object management apparatus, the storage unit includes a display object storing unit that stores a display object corresponding to processing data, an operation target object storing unit that associates and stores an operation target object corresponding to the operation target device and a specific region on a work plane where the operation target object is present, and a processing command storing unit that associates and stores position information of the mobile terminal, the displacement of the physical quantity of the mobile terminal, and a processing command for specifying processing to be performed on the operation target device using the display object. The method includes a display object transmitting step of transmitting the display object stored in the display object storing unit to the mobile terminal to cause the display unit to display the display object, a mobile terminal position acquiring step of acquiring the position information of the mobile terminal on the work plane by comparing a first image on the work plane photographed by the image photographing unit and in which the operation target object is displayed in the specific region and a second image in which the mobile terminal is displayed on the work plane, an region determining step of determining whether the position information is included in the specific region by comparing the position information of the mobile terminal acquired at the mobile terminal position acquiring step and the specific region of the operation target object stored in the operation target object storing unit, an operation target object determining step of determining the operation target object associated with the specific region from the operation target object storing unit after being determined that the position information is included in the specific region at the region determining step, a processing command determining physical quantity displacement receiving step of receiving the displacement of the physical quantity detected by the displacement detecting unit of the mobile terminal from the mobile terminal after the operation target object being determined at the operation target object determining step, a display object acquiring step of acquiring the display object transmitted to the mobile terminal at the display object transmitting step and displayed on the display unit from the display object storing unit when the displacement of the physical quantity is received at the processing command determining physical quantity displacement receiving step, a processing command searching step of searching for the processing command associated with the position information and the displacement of the physical quantity from the processing command storing unit using the position information of the mobile terminal acquired at the mobile terminal position acquiring step and the displacement of the physical quantity received at the processing command determining physical quantity displacement receiving step as search keys, and a processing command executing step of causing the operation target device corresponding to the operation target object determined at the operation target object determining step to execute the processing command searched for at the processing command searching step using the display object acquired at the display object acquiring step, wherein the steps are executed by the control unit.

An object management method according to still another aspect of the present invention executed by a mobile terminal communicably connected to at least one operation target device and an object management apparatus via a network. The mobile terminal includes a displacement detecting unit that detects a displacement of a physical quantity caused when the mobile terminal moves, a display unit, an image photographing unit, a storage unit, and a control unit. In the mobile terminal, the storage unit includes a display object storing unit that stores a display object corresponding to processing data, an operation target object storing unit that stores an operation target object corresponding to the operation target device, and a processing command storing unit that associates and stores the operation target object, the displacement of the physical quantity of the mobile terminal, and a processing command for specifying processing to be performed on the operation target device using the display object. The method includes a display object displaying step of displaying the display object stored in the display object storing unit on the display unit, an operation target object extracting step of extracting, based on at least a portion of images on a work plane photographed by the image photographing unit and in which the operation target object is displayed in the specific region, the operation target object in the images, a matching determining step of determining whether two operation target objects match by comparing the operation target object extracted at the operation target object extracting step and the operation target object stored in the operation target object storing unit, an operation target object determining step of determining the matched operation target object from the operation target object storing unit after being determined that the two operation target objects match at the matching determining step, a processing command determining physical quantity displacement detecting step of detecting the displacement of the physical quantity by the displacement detecting unit after the operation target object being determined at the operation target object determining step, a display object acquiring step of acquiring the display object displayed on the display unit at the display object displaying step from the display object storing unit when the displacement of the physical quantity is detected at the processing command determining physical quantity displacement detecting step, a processing command searching step of searching for the processing command associated with the operation target object and the displacement of the physical quantity from the processing command storing unit using the operation target object determined at the operation target object determining step and the displacement of the physical quantity detected at the processing command determining physical quantity displacement detecting step as search keys, and a processing command executing step of causing the operation target device corresponding to the operation target object determined at the operation target object determining step to execute the processing command searched for at the processing command searching step using the display object acquired at the display object acquiring step, wherein the steps are executed by the control unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment (the first embodiment and the second embodiment) of an object management apparatus, a mobile terminal, an object management method, and, a program according to the present invention will be explained below in detail based on the drawings. The embodiment does not limit the invention.

OVERVIEW OF THE INVENTION

The following outlines the present invention, and then, a configuration and processing of the present invention are explained in detail with reference to FIGS. 1 to 5.

First, one example of basic principle of the present invention will be explained below with reference to FIGS. 1 to 4.

Figure 1:
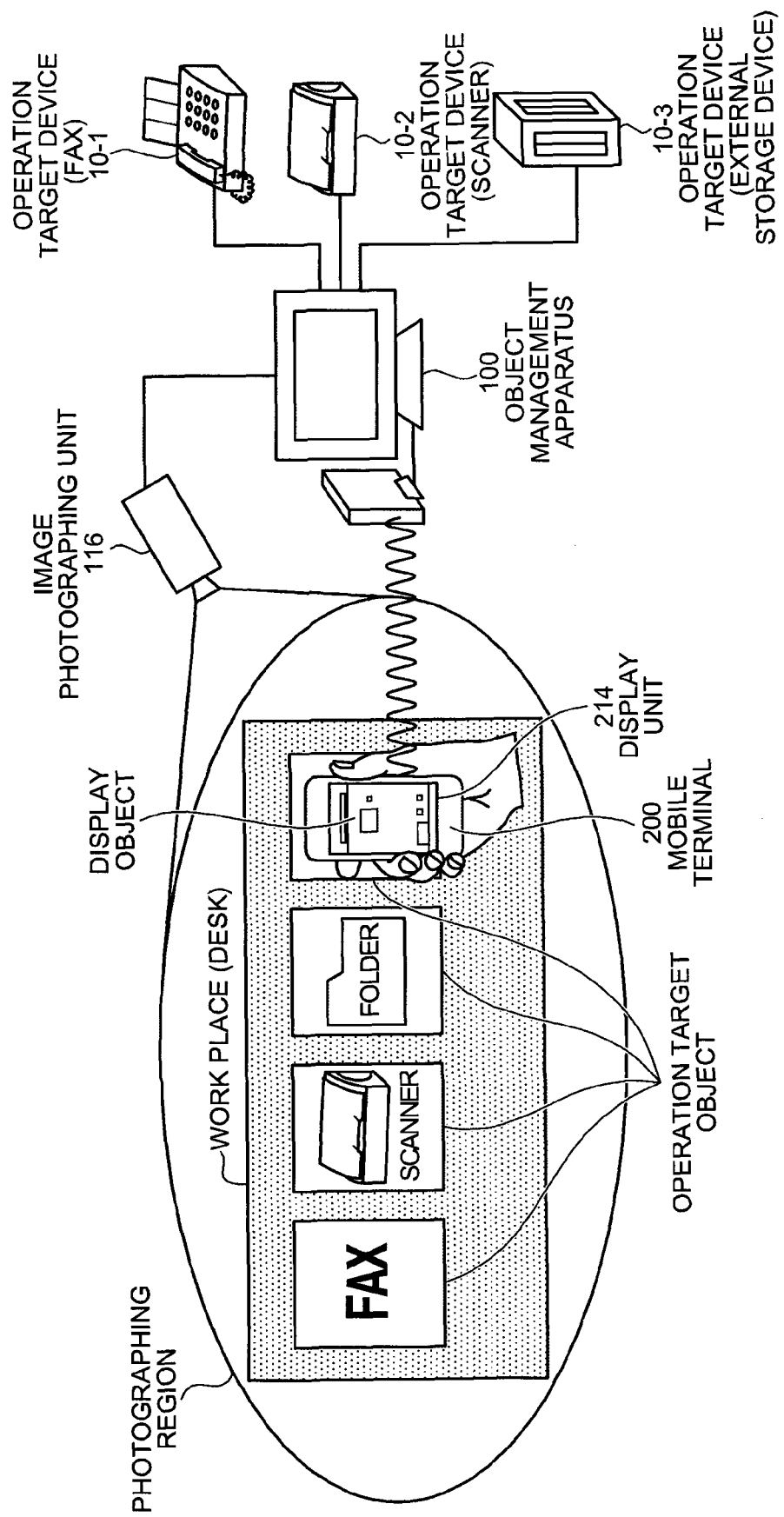
FIG. 1 is a view showing one example of basic principle of the present invention.

As shown in FIG. 1, the invention has schematically following basic features. In other word, the object management apparatus 100 includes an image photographing unit 116, a storage unit, and a control unit. The object management apparatus 100 communicably connected to at least one operation target device 10-1 to 3 (for example, a FAX, scanner, external storage unit) and a mobile terminal 200 including a displacement detecting unit (not shown) that detects a displacement of a physical quantity caused when the mobile terminal 200 moves and a display unit 214 via a network.

Here, in FIG. 1, an image photographing unit 116 photographs a work plane (such as a desk) on which at least one operation target object (for example, a character, symbol, photo, figure, or model representing a FAX, scanner, folder and the like) corresponding to an operation target device 10 in a photographing region is marked. Also in FIG. 1, a display unit 214 of a mobile terminal 200 displays a display object (for example, processing data such as image data) transmitted from an object management apparatus 100. In the present invention, for example, the work plane may be prepared by cards such as photos representing at least one operation target device 10 being arranged on a desk or the like by the user, or a table or the like on which a figure, symbol or the like representing the operation target device 10 is printed in advance may be used as the work plane.

The displacement detecting unit of the mobile terminal 200 detects a displacement of a physical quantity. For example, the displacement detecting unit may be a three-axis acceleration sensor, and the displacement detecting unit may be formed of an acceleration sensor, a gyroscope, or a magnetic sensor, or a combination of any of them.

The "physical value" refers to a value (e.g., time, mass, velocity, scalar, or vector) that is inherent in an object to be measured and can be measured objectively. Examples of the physical value are acceleration and gravity acceleration in measurement using the acceleration sensor, angular velocity in measurement using the gyroscope, and intensity and direction of magnetic field in measurement using the magnetic sensor.

A "display object" is image data or the like in which processing data corresponding to image data, an electronic file or the like is displayed. More specifically, a display object may be image data of a manuscript or the like read in advance by an image reader (not shown) such as a scanner following a user's operation. Also, a display object may be image data of a photo or the like photographed in advance by the user using a digital camera or the like. A display object may be image data attached, for example, to an e-mail downloaded in advance via a network following a user's operation. A display object may be image data downloaded in advance via a portable storage device (such as an SD card) following a user's operation. Also, a display object may be image data created in advance via the input unit such as a keyboard and mouse following a user's operation.

An "operation target object" is image data or the like corresponding to the operation target device 10 such as a PC peripheral (for example, a FAX, scanner, external storage device) controllably connected to the object management apparatus 100 and may be image data representing, for example, a character, symbol, figure, photo, or model representing the operation target device 10. More specifically, an operation target object may be image data of a character, symbol, figure and the like representing the operation target device 10 created in advance by the user by handwriting or using a PC or the like. Also, an operation target object may be image data of a photo or the like representing the operation target device 10 photographed in advance using a digital camera and output by the user. An operation target object may be image data of a model or the like of the operation target device 10 created in advance by the user. These operation target objects may contain characteristic information to determine at least one of a character, symbol, figure, photo, and model to identify the operation target device 10 corresponding to the operation target object.

Then, as shown in FIG. 1, when, as an example of the basic principle of the present invention, the user holds the mobile terminal 200 over an operation target object placed on the work plane such as a desk, a control unit of the object management apparatus 100 controls the image photographing unit 116 provided to the object management apparatus 100 to acquire position information of the mobile terminal 200 by always monitoring the spatial relationship between the mobile terminal 200 held by the user and the operation target object (for example, a photo, figure and the like representing a FAX, scanner, folder and so on) in the photographing range of the image photographing unit 116 using a live view function or the like. Then, the control unit of the object management apparatus 100 determines whether the mobile terminal 200 is positioned over a specific region of the operation target object whose operation is desired by the user based on the acquired position information of the mobile terminal 200. If the control unit of the object management apparatus 100 determines that the mobile terminal 200 is positioned over a specific region of a specific operation target object (that is, if the control unit determines that the operation target object whose operation is desired by the user is selected), a displacement detecting unit of the mobile terminal 200 detects a predetermined operation (for example, an operation of pulling the mobile terminal 200 toward you or holding up the mobile terminal 200 backward) performed by the user using the mobile terminal 200 over the operation target object as a displacement of a physical quantity (such as acceleration) and transmits the displacement to the object management apparatus 100. Then, the control unit of the object management apparatus 100 determines and executes the processing command specifying processing (for example, viewing received data of FAX, transmitting processing data by FAX and the like) performed using the display object displayed on the display unit 214 of the mobile terminal 200 in real time based on the received displacement of the physical quantity.

Figure 2:
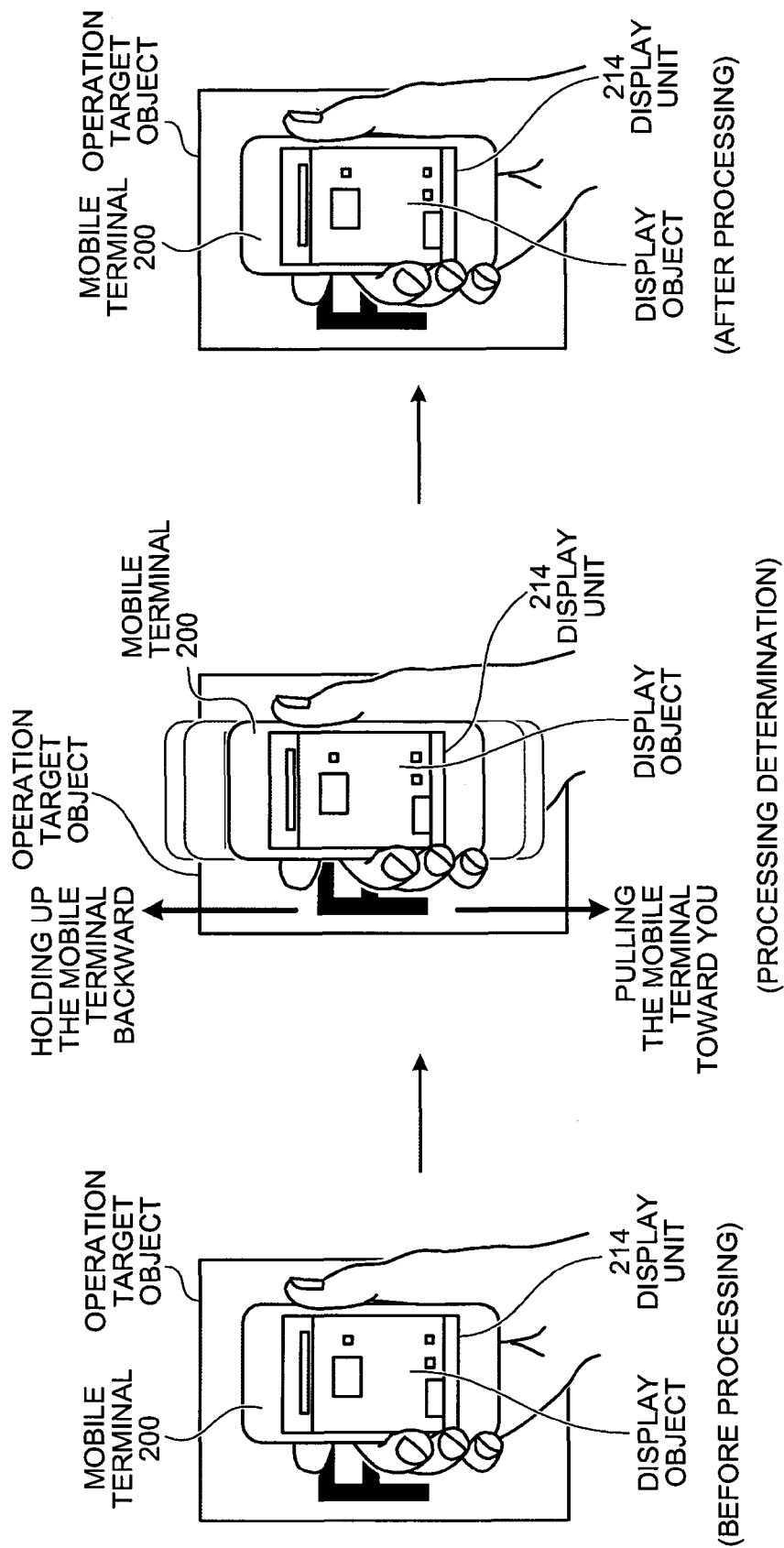
FIG. 2 is a view showing one example of the processing determination of the present invention.

Here, an example of the processing determination based on a predetermined operation of the mobile terminal 200 will be explained below with reference to FIG. 2. When the user holds the mobile terminal 200 over an operation target object placed on the work plane such as a desk, as shown in the left figure in FIG. 2, the control unit of the object management apparatus 100 determines that the mobile terminal 200 is positioned over a specific region of the operation target object. Then, if, as shown in the center figure in FIG. 2, the user performs a predetermined operation (for example, an operation of pulling the mobile terminal 200 toward you or holding up the mobile terminal 200 backward) using the mobile terminal 200 over the operation target object, the displacement detecting unit of the mobile terminal 200 detects the predetermined operation as a displacement of a physical quantity (such as acceleration) and transmits the displacement to the object management apparatus 100. Then, as shown in the right figure in FIG. 2, the control unit of the object management apparatus 100 acquires the display object displayed on the display unit 214 of the mobile terminal 200 from the storage unit when the displacement of the physical quantity is received.

Figure 3:
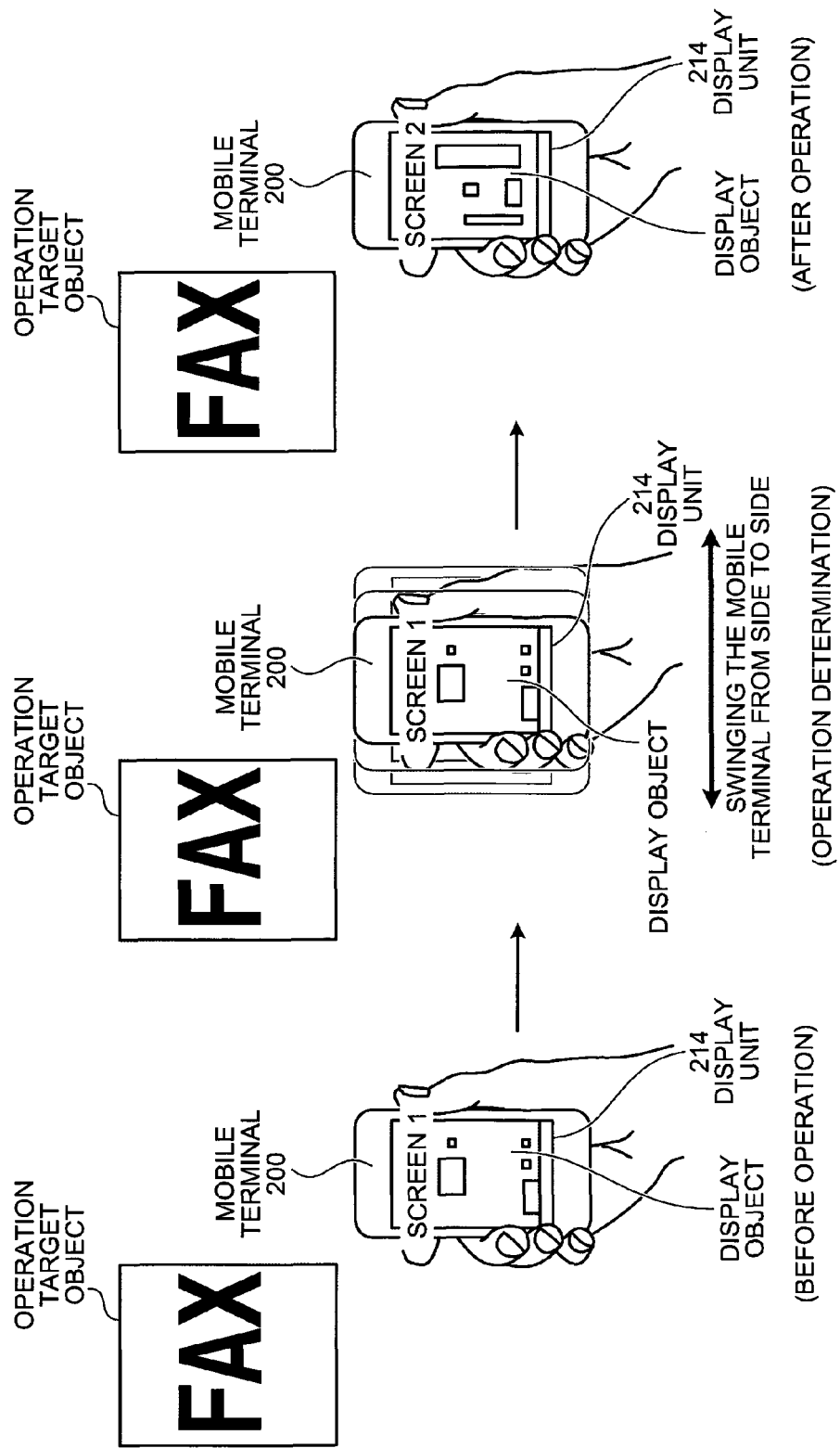
FIG. 3 is a view showing one example of the operation determination of the present invention.
Figure 4:
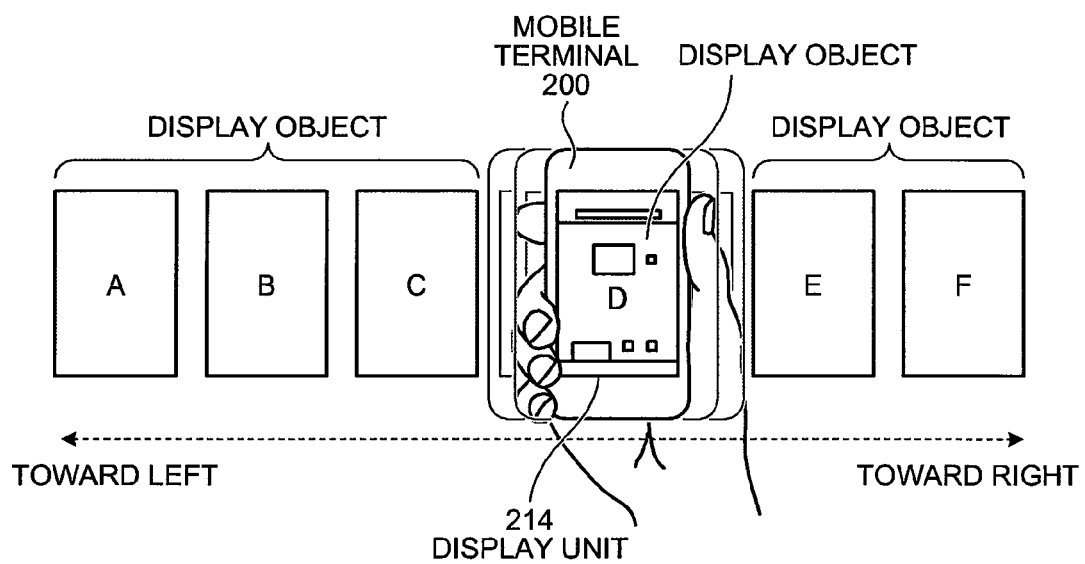
FIG. 4 is a view showing one example of the operation determination of the present invention.

An example of the operation determination based on a predetermined operation of the mobile terminal 200 will be explained below with reference to FIG. 3 and FIG. 4. When the user uses the mobile terminal 200 outside a region over an operation target object placed on the work plane such as a desk, as shown in the left figure in FIG. 3, the control unit of the object management apparatus 100 determines that the mobile terminal 200 is not positioned over a specific region of the operation target object. Then, if, as shown in the center figure in FIG. 3, the user performs a predetermined operation (for example, an operation of swinging the mobile terminal 200 from side to side) using the mobile terminal 200 outside a region over the operation target object, the displacement detecting unit of the mobile terminal 200 detects the predetermined operation as a displacement of a physical quantity (such as acceleration) and transmits the displacement to the object management apparatus 100. Then, as shown in the right figure in FIG. 3, the control unit of the object management apparatus 100 performs, for example, operation processing to switch the display screen by transmitting another display object that is different from the display object displayed on the display unit 214 of the mobile terminal 200 to cause the display unit 214 to display the display object according to the displacement of the physical quantity of the mobile terminal 200 when the displacement of the physical quantity is received. In the right figure in FIG. 3, as an example, the display object (that is, the display screen) displayed on the display unit 214 is switched from a screen 1 to a screen 2. That is, as shown in FIG. 4, the control unit of the object management apparatus 100 sequentially transmits display objects (for example, images A to F in FIG. 4) stored in the storage unit to the mobile terminal 200 according to an operation to swing the mobile terminal 200 from side to side to cause the display unit 214 to display the display object so that the user is allowed to select the display object (for example, the image D in FIG. 4) to be used for processing.

Subsequently, another example of basic principle of the present invention will be explained below with reference to FIGS. 2 to 5.

Figure 5:
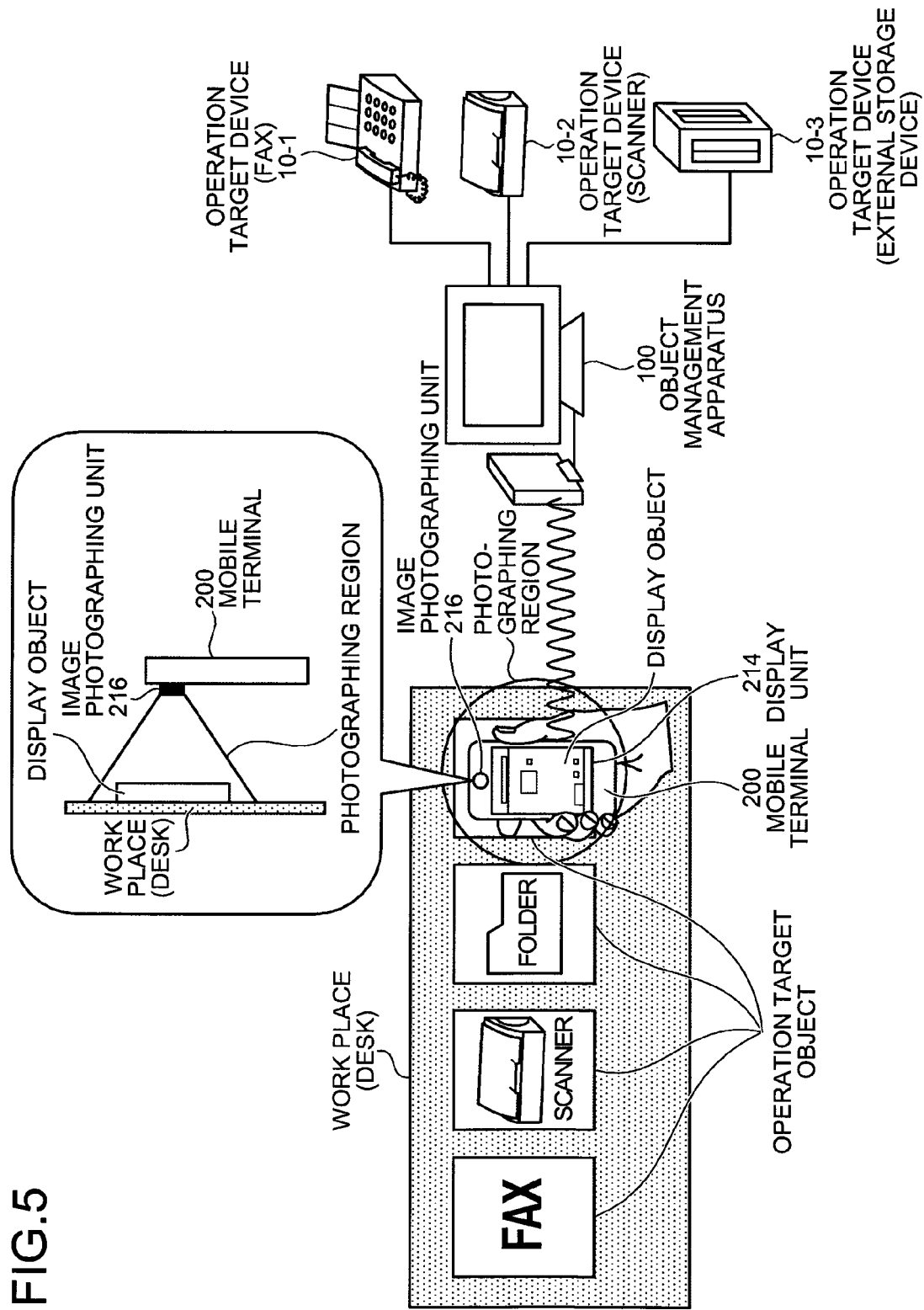
FIG. 5 is a view showing another example of basic principle of the present invention.

As shown in FIG. 5, the invention has schematically following basic features. In other word, the mobile terminal 200 communicably connected to at least one operation target device 10-1 to 3 (for example, a FAX, scanner, external storage device) and the object management apparatus 100 via a network. The mobile terminal 200 includes a displacement detecting unit (not shown) that detects a displacement of a physical quantity caused when the mobile terminal 200 moves, a display unit 214, an image photographing unit 216, a storage unit, and a control unit.

Explanations about the image photographing unit 216, the display unit 214, the displacement detecting unit, display objects, and operation target objects are the same as those in the above examples and thus are omitted.

Then, as shown in FIG. 5, when, as another example of the basic principle of the present invention, the user holds the mobile terminal 200 over an operation target object placed on the work plane such as a desk, the control unit of the mobile terminal 200 photographs an operation target object (for example, a photo, figure and the like representing a FAX, scanner, folder) in the photographing range of the image photographing unit 216 by controlling the image photographing unit 216 and extracts the operation target object from the photographed image. Then, the control unit of the mobile terminal 200 compares the extracted operation target object and the operation target object stored in advance in the mobile terminal 200 to determine whether the two operation target objects match and determines, based on a determination result, whether the mobile terminal 200 is positioned over the operation target object whose operation is desired by the user. If the control unit of the mobile terminal 200 determines that the mobile terminal 200 is positioned over the operation target object (that is, if the control unit determines that the operation target object whose operation is desired by the user is selected), the displacement detecting unit of the mobile terminal 200 detects the predetermined operation (for example, an operation of pulling the mobile terminal 200 toward you or holding up the mobile terminal 200 backward) performed by the user using the mobile terminal 200 over the operation target object as a displacement of a physical quantity (such as acceleration). Then, the control unit of the mobile terminal 200 determines and executes the processing command specifying processing (for example, viewing received data of FAX, transmitting processing data by FAX) performed using the display object displayed on the display unit 214 of the mobile terminal 200 in real time based on the detected displacement of the physical quantity.

Here, an example of the processing determination based on a predetermined operation of the mobile terminal 200 will be explained below again with reference to FIG. 2. When the user holds the mobile terminal 200 over an operation target object placed on the work plane such as a desk, as shown in the left figure in FIG. 2, the control unit of the mobile terminal 200 determines that the mobile terminal 200 is positioned over a specific operation target object based on an image photographed by the image photographing unit 216 provided to the mobile terminal 200. Then, if, as shown in the center figure in FIG. 2, the user performs a predetermined operation (for example, an operation of pulling the mobile terminal 200 toward you or holding up the mobile terminal 200 backward) using the mobile terminal 200 over the operation target object, the displacement detecting unit of the mobile terminal 200 detects the predetermined operation as a displacement of a physical quantity (such as acceleration). Then, as shown in the right figure in FIG. 2, the control unit of the mobile terminal 200 acquires the display object displayed on the display unit 214 from the storage unit when the displacement of the physical quantity is detected.

An example of the operation determination based on a predetermined operation of the mobile terminal 200 will be explained below again with reference to FIG. 3 and FIG. 4. When the user uses the mobile terminal 200 outside a region over an operation target object placed on the work plane such as a desk, as shown in the left figure in FIG. 3, the control unit of the mobile terminal 200 determines that the mobile terminal 200 is not positioned over a specific operation target object. Then, if, as shown in the center figure in FIG. 3, the user performs a predetermined operation (for example, an operation of swinging the mobile terminal 200 from side to side) using the mobile terminal 200 outside the region over the operation target object, the displacement detecting unit of the mobile terminal 200 detects the predetermined operation as a displacement of a physical quantity (such as acceleration). Then, as shown in the right figure in FIG. 3, the control unit of the mobile terminal 200 performs, for example, operation processing to switch the display screen by causing the display unit 214 to display another display object that is different from the display object displayed on the display unit 214 of the mobile terminal 200 according to the displacement of the physical quantity of the mobile terminal 200 when the displacement of the physical quantity is detected. As shown in the right figure in FIG. 3, as an example, the display object (that is, the display screen) displayed on the display unit 214 is switched from the screen 1 to the screen 2 by processing of the control unit of the mobile terminal 200. That is, as shown in FIG. 4, the control unit of the mobile terminal 200 sequentially displays display objects (for example, images A to F in FIG. 4) stored in the storage unit on the display unit 214 according to an operation to swing the mobile terminal 200 from side to side so that the user is allowed to select the display object (for example, the image D in FIG. 4) to be used for processing.

Subsequently, the configuration and processing of the present invention will be explained in detail below with reference to FIG. 6 to FIG. 11 separately for a first embodiment and a second embodiment.

Configuration of the Object Operation System in the First Embodiment

First, configuration of the object operation system in the first embodiment will be explained below with reference to FIGS. 6 to 8.

Figure 6:
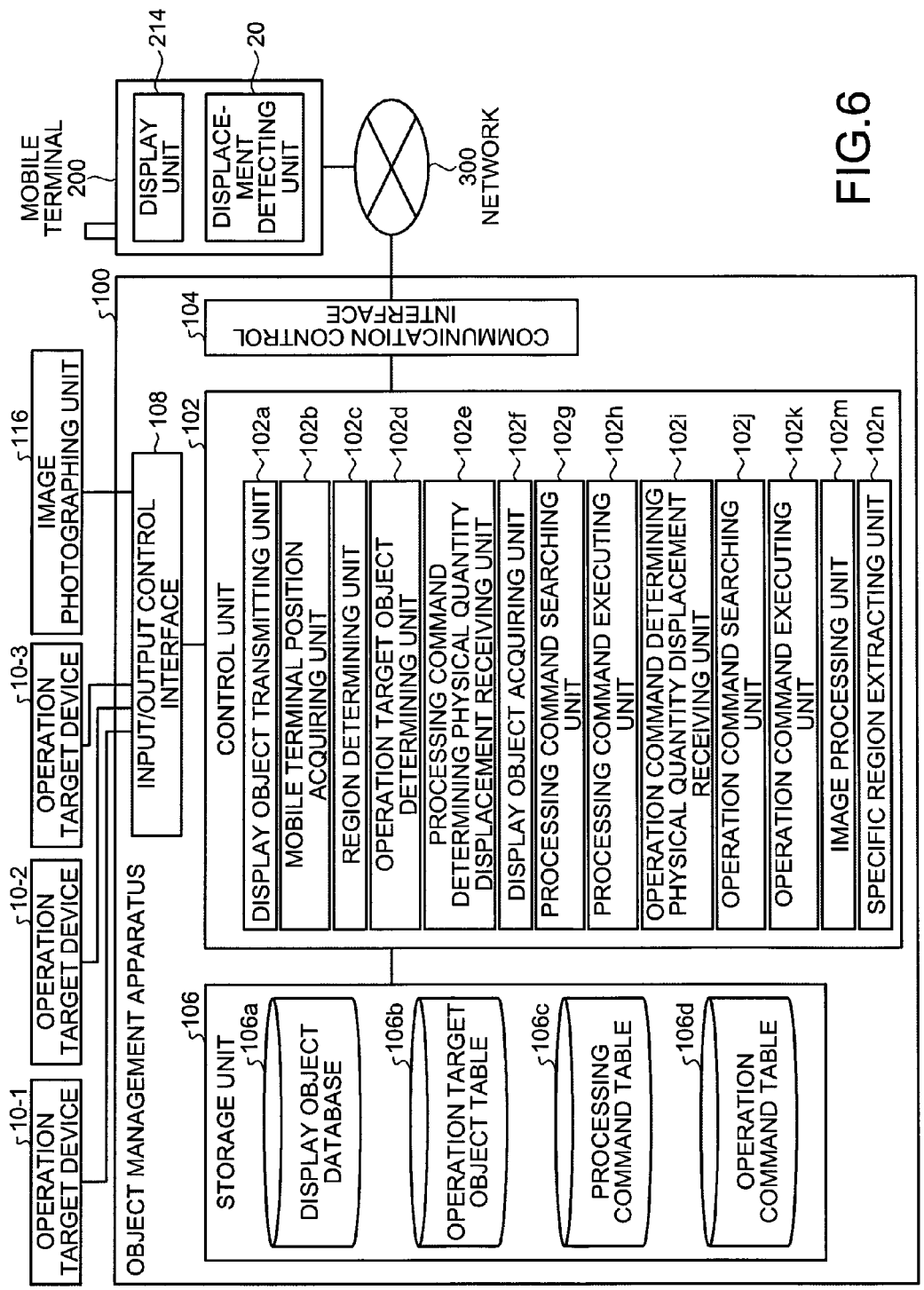
FIG. 6 is a block diagram showing one example of a configuration of an object management system according to a first embodiment.
Figure 7:
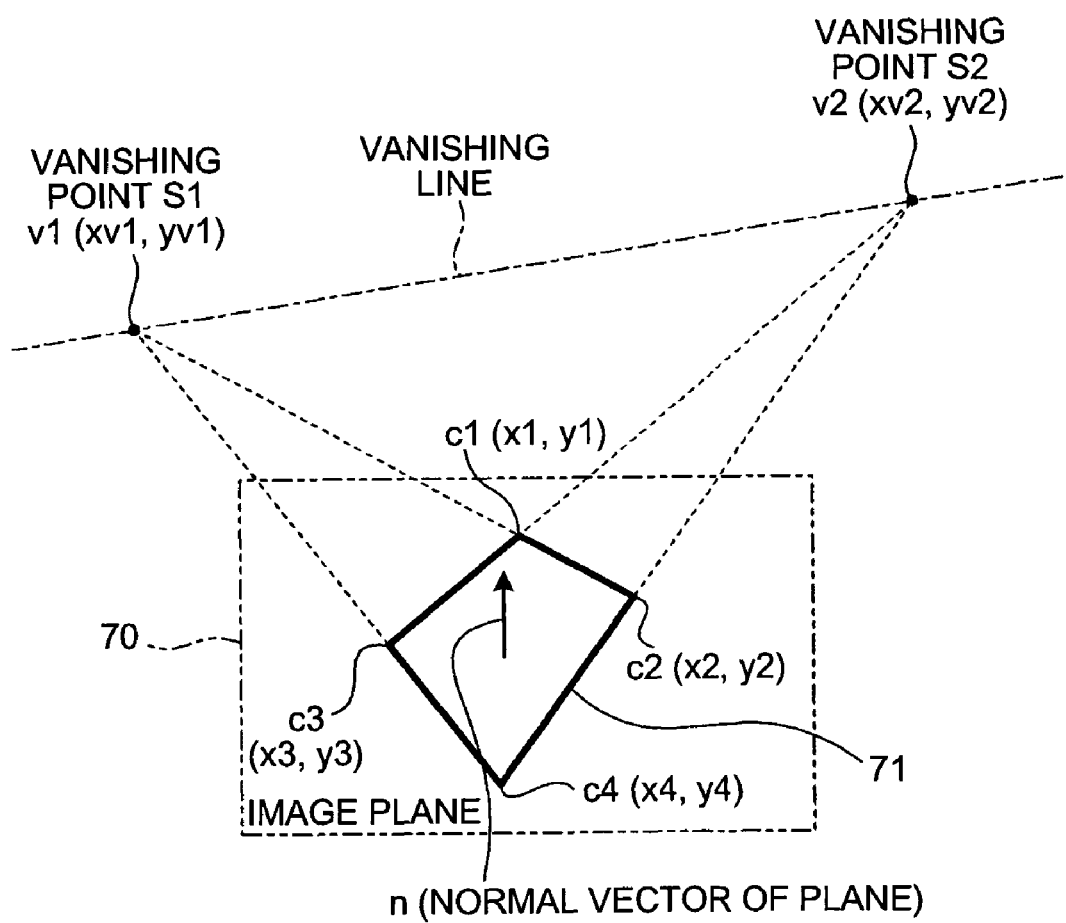
FIG. 7 is a view showing one example of a projective transformation according to the embodiment.

In FIG. 6, the object operation system in the first embodiment includes at least the object management apparatus 100 and the mobile terminal 200 communicably connected via a network 300. The configuration of the object management apparatus 100 in the first embodiment will be explained first and then, that of the mobile terminal 200 in the first embodiment will be explained.

Configuration of the Object Management Apparatus 100 in the First Embodiment

In FIG. 6, the object management apparatus 100 schematically includes at least the image photographing unit 116, a storage unit 106, and a control unit 102. The object management apparatus 100 is also controllably connected to at least one operation target device 10-1 to 3 (for example, a FAX, scanner, external storage device and the like). Moreover, the object management apparatus 100 is communicably connected to the network 300 such as the Internet via a communication device such as a router and a wire or wireless communication line such as a dedicated line, and communicably connected to the mobile terminal 200 provided at least with a displacement detecting unit 20 that detects a displacement of a physical quantity caused when the mobile terminal 200 moves and the display unit 214 via the network 300. The configuration of the mobile terminal 200 in the first embodiment will be described later.

In FIG. 6, the control unit 102 of the object management apparatus 100 is a CPU or the like that controls the whole object management apparatus 100 in a unified fashion. The storage unit 106 of the object management apparatus 100 is a device to store various databases and tables. An input/output control interface 108 of the object management apparatus 100 is an interface connected to the input unit (not shown), an output unit (not shown), the image photographing unit 116, or at least one of the operation target devices 10-1 to 3. The input/output control interface 108 of the object management apparatus 100 controls the input unit, the output unit, the image photographing unit 116, and at least one of the operation target devices 10-1 to 3. Here, in addition to a monitor (including a home TV set), a speaker may be used as an output unit of the object management apparatus 100 and a keyboard, mouse, microphone and the like may be used as an input unit of the object management apparatus 100. A communication control interface 104 of the object management apparatus 100 is an interface connected to a communication device (not shown) such as a router connected to a communication line and the like. Each unit of the object management apparatus 100 is communicably connected via any communication path.

Here, in FIG. 6, the image photographing unit 116 of the object management apparatus 100 has a function to photograph an image of at least one operation target object on the work plane within a photographing range or the mobile terminal 200 and is a video camera, digital camera, Web camera or the like constructed from a charge coupled device or solid state image pickup device such as CCD (Charge Coupled Device) and CMOS (Complementary Metal Oxide Semiconductor).

In FIG. 6, the operation target devices 10-1 to 3 are devices such as PC peripherals operated by the object management apparatus 100 and are connected, for example, to the object management apparatus 100 via a wire or wireless network, or may be a FAX, scanner, external storage device and the like.

In FIG. 6, the communication control interface 104 controls communication between the object management apparatus 100 and the network 300. That is to say, the communication control interface 104 has a function to communicate data to an external device such as the mobile terminal 200 through a communication line. The network 300 has function of connecting the object management apparatus 100 with the external device such as the mobile terminal 200, and may include internet, intranet, LAN (wired/wireless), public telephone network (analog/digital), or the like.

In FIG. 6, the various databases and tables (such as a display object database 106*a*, an operation target object table 106*b*, a processing command table 106*c*, and an operation command table 106*d*) stored in the storage unit 106 of the object management apparatus 100 are storage units such as fixed disk devices, and store various programs, various tables, various databases, various file, and the like used in various processes.

Among components of the storage unit 106, the display object database 106*a* is a display object storing unit that stores, as a display object, image data or the like corresponding to processing data such as image data and an electronic file used for the processing target device. As an example, the display object database 106*a* may store image data of a manuscript or the like read in advance by an image reader (not shown) such as a scanner following a user's operation as a display object. Also, the display object database 106*a* may store image data of a photo or the like photographed in advance by the user using a digital camera as a display object. The display object database 106*a* may store image data attached, for example, to an e-mail downloaded in advance via a network following a user's operation as a display object. The display object database 106*a* may store image data downloaded in advance via a portable storage device (such as an SD card) following a user's operation as a display object. Also, the display object database 106*a* may store image data created in advance via the input unit such as a keyboard and mouse following a user's operation as a display object.

The operation target object table 106*b* is an operation target object storing unit that associates and stores an operation target object such as image data corresponding to the operation target device 10, which is a device (for example, a FAX, scanner, external storage device) such as a PC peripheral operated by the object management apparatus 100, and a specific region (for example, a region where an operation target object such as a photo is placed on the work plane such as a desk) on the work plane where the operation target object is present. Here, an operation target object may contain characteristic information to determine at least one of a character, symbol, figure, photo, and model to identify the operation target device 10 corresponding to the operation target object. As an example, the operation target object table 106*b* may associate and store image data containing characteristic information to determine an operation target object such as a character, symbol, and figure representing the operation target device 10 created in advance by the user by handwriting or using a PC or the like and a specific region of an operation target object on the work plane determined in advance by coordinate calculations and the like based on an image including the operation target object photographed by the image photographing unit 116 following a user's operation. Also, the operation target object table 106*b* may associate and store image data containing characteristic information to determine an operation target object such as a photo representing the operation target device 10 photographed and output in advance by the user using a digital camera and a model of the operation target device 10 created in advance by the user and a specific region of an operation target object on the work plane determined in advance by coordinate calculations and the like based on an image including the operation target object photographed by the image photographing unit 116 following a user's operation. Incidentally, the operation target object table 106*b* may associate and store a specific region on the work plane where an operation target object extracted from the work plane image in which the operation target object is displayed based on characteristic information is present and the operation target object by the control unit 102.

The processing command table 106*c* is a processing command storing unit that associates and stores position information of the mobile terminal 200 acquired in advance from coordinates or the like based on an image on the work plane including an operation target object photographed by the image photographing unit 116, a displacement of a physical quantity of the mobile terminal 200 input in advance as numeric information (for example, a numeric value representing a displacement of a physical quantity when the user holds up the mobile terminal 200 backward or pulls toward you) or the like by the user via the input unit such as a keyboard, and a processing command specifying processing to be performed on the operation target device 10 using a display object corresponding to processing data acquired in advance by the user as described above.

Here, a "processing command" is an instruction to cause the operation target device 10 to perform processing specified by the user using a display object and is a concept including, in addition to programs, macros, and tools for performing the processing, instructions (file names, execution parameters and the like) to activate such programs, macros, and tools. As an example, a processing command may be a command specifying processing to cause the display unit 214 of the mobile terminal 200 to display data (display object) such as a document received by the FAX (the operation target device 10-1), processing to cause the display unit 214 of the mobile terminal 200 to display image data (display object) such as a manuscript read by the scanner (the operation target device 10-2), and storage of processing data (display object) such as a document file displayed on the display unit 214 in a predetermined folder after being transmitted to the external storage device (the operation target device 10-3).

The operation command table 106d is an operation command storing unit that associates and stores a displacement of a physical quantity of the mobile terminal 200 input in advance as numeric information (for example, a numeric value representing a displacement of a physical quantity when the user swings the mobile terminal 200 from side to side) or the like by the user via the input unit such as a keyboard and an operation command specifying operation processing on a display object corresponding to processing data (for example, image data and a document file) displayed on the display unit 214 of the mobile terminal 200.

An "operation command" stored in the operation command table 106d is here an instruction to cause the operation target device 10 to perform processing specified by the user using a display object and is a concept including, in addition to programs, macros, and tools for performing the processing, instructions (file names, execution parameters and the like) to activate such programs, macros, and tools. As an example, an operation command may be a command that specifies an operation to switch the display screen by extracting another display object that is different from the display object displayed on the display unit 214 of the mobile terminal 200 from the display object database 106a and causing the display unit 214 of the mobile terminal 200 to display the other display object.

In FIG. 6, the control unit 102 of the object management apparatus 100 includes an internal memory that stores a control program such as an operating system (OS), programs specifying various processing procedures, and necessary data and performs information processing for executing various pieces of processing by using these programs. The control unit 102 functionally and conceptually includes a display object transmitting unit 102a, a mobile terminal position acquiring unit 102b, an region determining unit 102c, an operation target object determining unit 102d, a processing command determining physical quantity displacement receiving unit 102e, a display object acquiring unit 102f, a processing command searching unit 102g, a processing command executing unit 102h, an operation command determining physical quantity displacement receiving unit 102i, an operation command searching unit 102j, an operation command executing unit 102k, an image processing unit 102m, and a specific region extracting unit 102n.

Out of these units, the display object transmitting unit 102a transmits the display object stored in the display object database 106a to the mobile terminal 200 to cause the display unit 214 to display the display object.

The mobile terminal position acquiring unit 102b acquires the position information of the mobile terminal 200 on the work plane by comparing a first image on the work plane photographed by the image photographing unit 116 and in which the operation target object is displayed in the specific region and a second image in which the mobile terminal 200 is displayed on the work plane. Here, the mobile terminal position acquiring unit 102b may acquire the position information of the mobile terminal 200 on the work plane by comparing the first image and the second image after the projective transformation on which image processing is performed by the image processing unit 102m to be described later.

The region determining unit 102c determines whether the position information is included in the specific region by comparing the position information of the mobile terminal 200 acquired by the mobile terminal position acquiring unit 102b and the specific region of the operation target object stored in the operation target object table 106b.

The operation target object determining unit 102d determines the operation target object associated with the specific region from the operation target object table 106b when the region determining unit 102c determines that the position information is included in the specific region.

The processing command determining physical quantity displacement receiving unit 102e receives the displacement of the physical quantity detected by the displacement detecting unit 20 of the mobile terminal 200 from the mobile terminal 200 after the operation target object being determined by the operation target object determining unit 102d.

The display object acquiring unit 102f acquires the display object transmitted to the mobile terminal 200 by the display object transmitting unit 102a and displayed on the display unit 214 from the display object database 106a when the displacement of the physical quantity is received by the processing command determining physical quantity displacement receiving unit 102e.

The processing command searching unit 102g searches for the processing command associated with the position information and the displacement of the physical quantity from the processing command table 106c using the position information of the mobile terminal 200 acquired by the mobile terminal position acquiring unit 102b and the displacement of the physical quantity received by the processing command determining physical quantity displacement receiving unit 102e as search keys.

The processing command executing unit 102h causes the operation target device 10 corresponding to the operation target object determined by the operation target object determining unit 102d to execute the processing command searched for by the processing command searching unit 102g using the display object acquired by the display object acquiring unit 102f.

The operation command determining physical quantity displacement receiving unit 102i receives the displacement of the physical quantity detected by the displacement detecting unit 20 of the mobile terminal 200 from the mobile terminal 200 after being determined by the region determining unit 102c that the position information is not included in the specific region.

The operation command searching unit 102j searches for the operation command associated with the displacement of the physical quantity from the operation command table 106d using the displacement of the physical quantity received by the operation command determining physical quantity displacement receiving unit 102i as the search key.

The operation command executing unit 102k executes the operation command searched for by the operation command searching unit 102j on the display object.

The image processing unit 102m performs image processing on the first image and the second image acquired by the image photographing unit 116 so that the first image and the second image become images photographed from a front direction by performing projective transformation.

The projective transformation performed by the image processing unit 102m is explained with reference to FIGS. 7 and 8.

The projective transformation performed by the image processing unit 102m, for example, is executed by restoring the image photographed by the image photographing unit 116 to an original state by using an inverse projective transformation. An example of the projective transformation is explained below. As shown in FIG. 7, when performing the projective transformation, a vanishing point of the image on an imaging plane 70 being an image plane photographed by the image photographing unit 116 is obtained. For example, when an imaging plane shape 71 being an image shape on the imaging plane 70 is the rectangle as shown in FIG. 8, the two vanishing points S1 and S2 are obtained. The vanishing point is the point at which extended lines of two straight lines, which are formed parallel in an actual shape, cross to each other, when projecting a predetermined shape. By thus obtaining the vanishing point, an original size before the projection and the projective transformation parameters (a11 to a32) being the parameters when performing the projective transformation are obtained based on the vanishing point, and the projective transformation is performed using a following [Equation 1]. That is to say, the projective transformation is performed by obtaining a coordinate (u,v,1) after the projective transformation from a coordinate (x,y,1) before the projective transformation by the [Equation 1].

$$\begin{pmatrix} u \\ v \\ 1 \end{pmatrix} = \frac{1}{a31x + a32 + 1} \begin{pmatrix} a11 & a12 & a13 \\ a21 & a22 & a23 \\ a31 & a32 & 1 \end{pmatrix} \begin{pmatrix} x \\ y \\ 1 \end{pmatrix} \quad \text{(Equation 1)}$$

Figure 8:
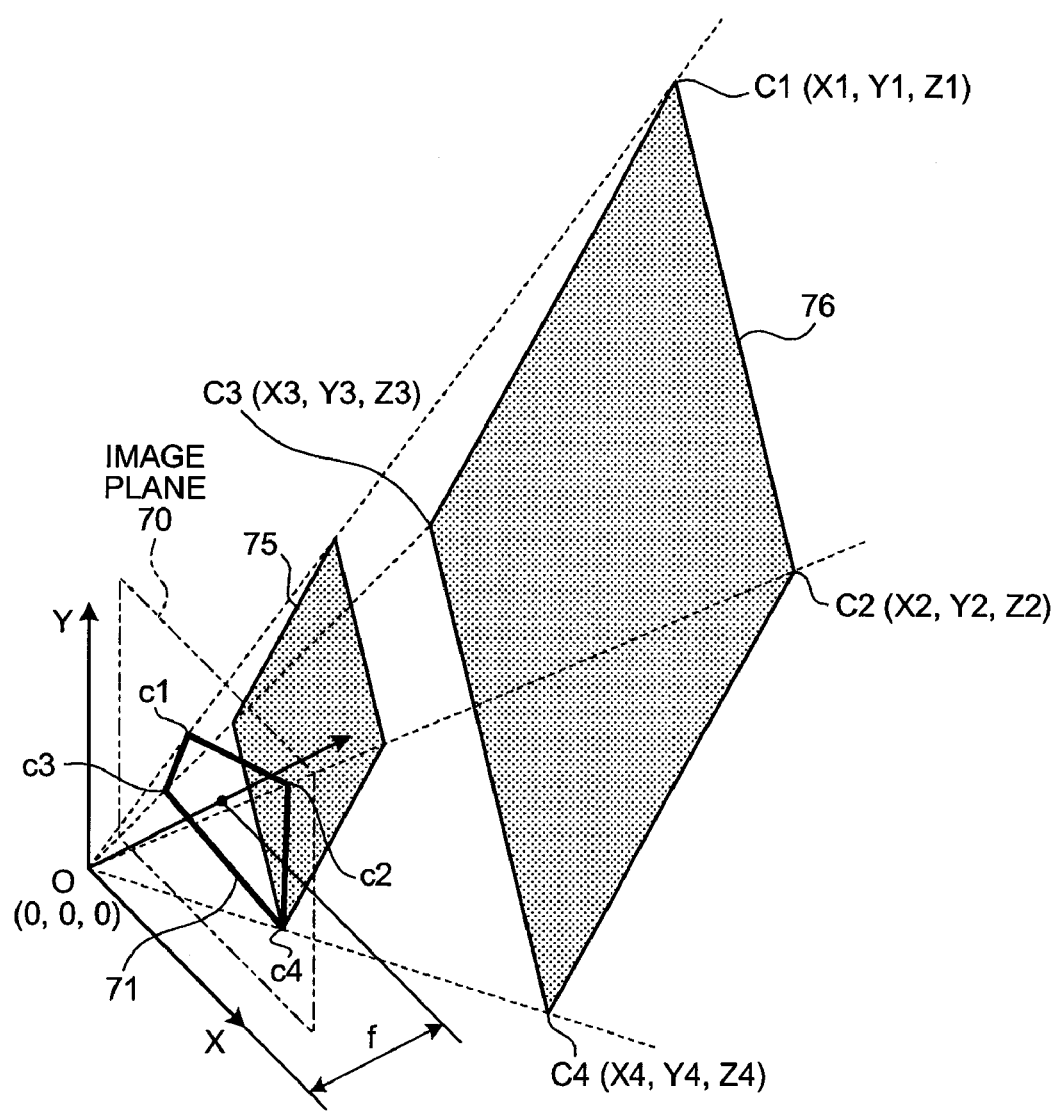
FIG. 8 is a view showing one example of the projective transformation according to the embodiment.

By thus performing the projective transformation on the coordinate of the imaging plane shape 71, which is the coordinate before the projective transformation, a projectively transformed shape 75, which is the shape after the projective transformation, may be obtained as shown in FIG. 8 by obtaining the coordinate after the projective transformation. The projectively transformed shape 75 is similar to an original shape 76, which is the shape when seeing the original imaged by the image photographing unit 116 from the front direction, that is to say, the shape when seeing the imaged plane in the vertical direction. In place of the projective transformation, various conventional arts may be used.

Referring back to FIG. 6 again, the specific region extracting unit 102n extracts the specific region on the work plane where the operation target object is present from the first image based on the characteristic information to associate the operation target object and the specific region extracted by the specific region extracting unit 102n and to store the associated operation target object and the associated specific region in the operation target object table 106b.

Configuration of the Mobile Terminal 200 in the First Embodiment

In FIG. 6, the mobile terminal 200 is communicably connected to the object management apparatus 100 via the network 300 and schematically includes a control unit (not shown) such as a CPU that controls the whole mobile terminal 200 in a unified fashion, a communication device (not shown) such as an antenna that realizes network communication (for example, Internet communication via a communication line such as by radio), a communication control interface unit (not shown) connected to a radio communication unit (not shown) to realize short distance communication (for example, communication by electric waves, infrared rays, IrDA, Bluetooth (registered trademark)), an input/output control interface unit (not shown) connected to an input unit (not shown) such as a key input unit, touch panel, and microphone, an output unit (not shown) such as a speaker, the displacement detecting unit 20 such as a three-axis acceleration sensor, an image photographing unit (not shown) such as a CCD camera, and the display unit 214 such as a display, and a storage unit (not shown) that stores databases and tables of data and programs used to perform various processing, and each of these units is communicably connected via any communication path. Here, the network 300 has a function to mutually connect the object management apparatus 100, other mobile terminals (not shown), and the external devices (not shown) and may be, for example, the Internet, a telephone network (including a mobile terminal network and a general telephone network), or an intranet.

Here, the display unit 214 of the mobile terminal 200 in the present embodiment is a displaying unit having a function to display, on the display unit 214, a display object received by a communication device such as an antenna and a radio communication unit from the object management apparatus 100 connected via the network 300. For example, the display unit 214 of the mobile terminal 200 may corresponds to a display made of liquid crystal, organic electro-luminescence, or the like.

The displacement detecting unit 20 of the mobile terminal 200 is a displacement detecting unit that detects the displacement of the physical value (e.g., acceleration, gravity acceleration, angular velocity, magnetic flux, direction, distance, angle, speed, time, or pressure) caused when the mobile terminal 200 moves. An example of the displacement detecting unit 20 is a sensor (e.g., a triaxial acceleration sensor, a gyroscope, or a magnetic sensor) having a function of changing the movement of the mobile terminal 200 into an electric signal.

The image photographing unit (not shown) of the mobile terminal 200 is an image photographing unit that photographs such as the operation target object on the work place. For example, the image photographing unit is a video camera, a digital camera, or a web camera formed of a solid-state image sensor such as a charge coupled device (CCD) and a complementary metal oxide semiconductor (CMOS).

Processing of the Object Management System in the First Embodiment

Subsequently, an example of processing of the object management system in the first embodiment will be explained below with reference to FIG. 9.

Processing of the Object Management in the First Embodiment

Figure 9:
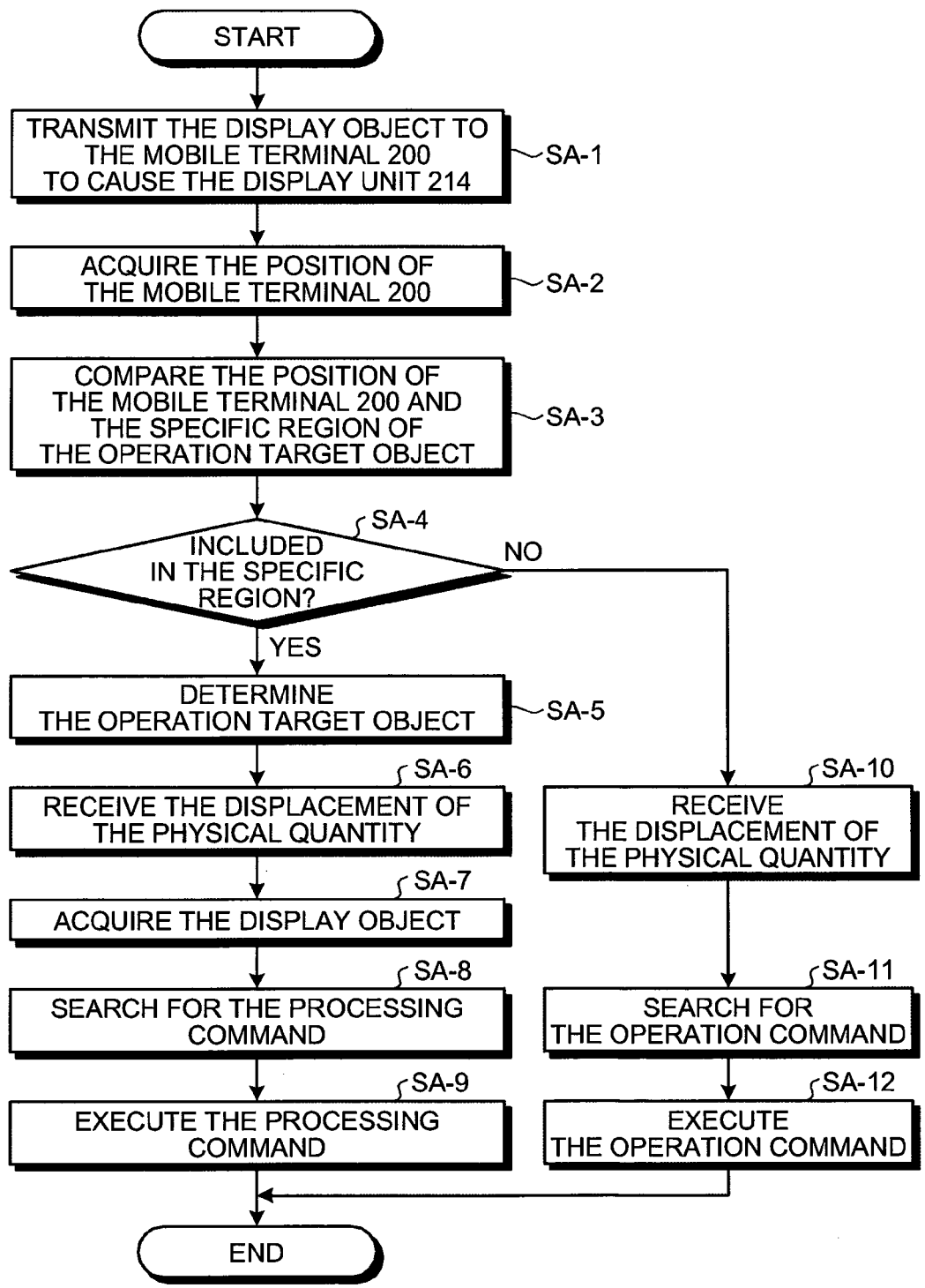
FIG. 9 is a flowchart showing one example of detail of an object management processing of the object management system according to the embodiment.

As shown in FIG. 9, the display object transmitting unit 102a of the object management apparatus 100 transmits the display object stored in the display object database 106a to the mobile terminal 200 to cause the display unit 214 to display the display object (step SA-1).

The mobile terminal position acquiring unit 102b of the object management apparatus 100 acquires the position information of the mobile terminal 200 on the work plane by comparing a first image on the work plane photographed by the image photographing unit 116 and in which the operation target object is displayed in the specific region and a second image in which the mobile terminal 200 is displayed on the work plane (step SA-2). Here, the image processing unit 102m of the object management apparatus 100 may perform image processing on a first image and a second image acquired by the image photographing unit 116 so that these images become images photographed from a front direction by performing projective transformation and a mobile terminal position acquiring unit 102b of the object management apparatus 100 may acquire position information of the mobile terminal 200 on the work plane by comparing the first image and the second image after the projective transformation on which image processing is performed by processing of the image processing unit 102m. A specific region extracting unit 102n may automatically update the operation target object table 106b by automatically extracting a specific region where an operation target object displayed on the work plane is present from the first image based on characteristic information by using an image processing technology such as image recognition.

The region determining unit 102c of the object management apparatus 100 compares the position information of the mobile terminal 200 acquired by the mobile terminal position acquiring unit 102b and the specific region of the operation target object stored in the operation target object table 106b (step SA-3).

The region determining unit 102c of the object management apparatus 100 determines whether the position information of the mobile terminal 200 is included in the specific region based on the result of comparing at the step SA-3 (step SA-4).

When the region determining unit 102c determines that the position information is included in the specific region (step SA-4: Yes), the operation target object determining unit 102d of the object management apparatus 100 determines the operation target object associated with the specific region from the operation target object table 106b (step SA-5).

The processing command determining physical quantity displacement receiving unit 102e of the object management apparatus 100 receives the displacement of the physical quantity detected by the displacement detecting unit 20 of the mobile terminal 200 from the mobile terminal 200 after the operation target object being determined by the operation target object determining unit 102d (step SA-6).

The display object acquiring unit 102f of the object management apparatus 100 acquires the display object transmitted to the mobile terminal 200 by the display object transmitting unit 102a and displayed on the display unit 214 from the display object database 106a when the displacement of the physical quantity is received by the processing command determining physical quantity displacement receiving unit 102e (step SA-7).

The processing command searching unit 102g of the object management apparatus 100 searches for the processing command associated with the position information and the displacement of the physical quantity from the processing command table 106c using the position information of the mobile terminal 200 acquired by the mobile terminal position acquiring unit 102b and the displacement of the physical quantity received by the processing command determining physical quantity displacement receiving unit 102e as search keys (step SA-8).

The processing command executing unit 102h of the object management apparatus 100 causes the operation target device 10 corresponding to the operation target object determined by the operation target object determining unit 102d to execute the processing command searched for by the processing command searching unit 102g using the display object acquired by the display object acquiring unit 102f (step SA-9).

Referring back to step SA-4 in FIG. 6, after being determined by the region determining unit 102c that the position information is not included in the specific region (step SA-4: No), the operation command determining physical quantity displacement receiving unit 102i of the object management apparatus 100 receives the displacement of the physical quantity detected by the displacement detecting unit 20 of the mobile terminal 200 from the mobile terminal 200 (step SA-10).

The operation command searching unit 102j of the object management apparatus 100 searches for the operation command associated with the displacement of the physical quantity from the operation command table 106d using the displacement of the physical quantity received by the operation command determining physical quantity displacement receiving unit 102i as the search key (step SA-11).

The operation command executing unit 102k of the object management apparatus 100 executes the operation command searched for by the operation command searching unit 102j on the display object (step SA-12).

Configuration of the Object Operation System in the Second Embodiment

Subsequently, configuration of the object operation system in the second embodiment will be explained below with reference to FIG. 10.

Figure 10:
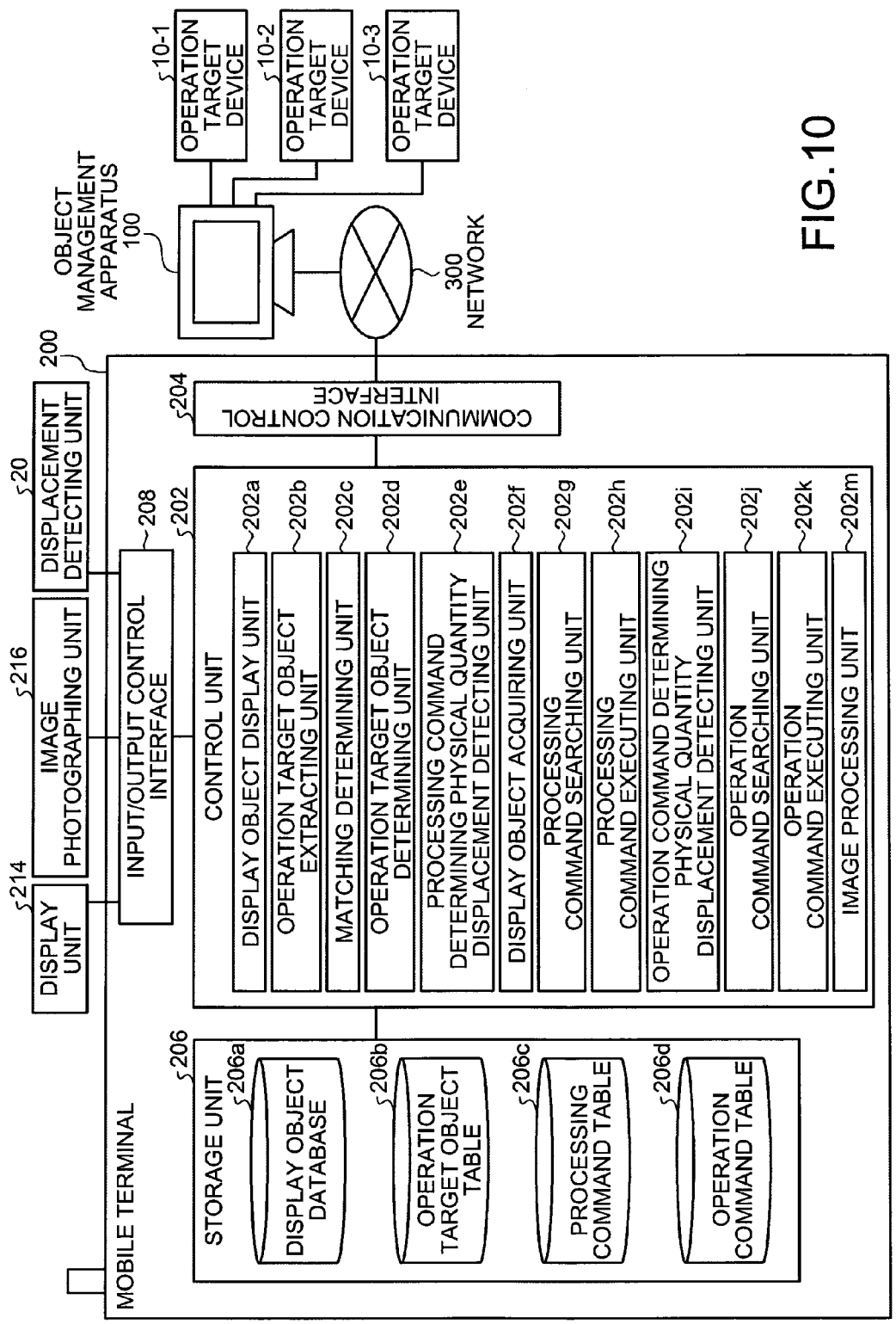
FIG. 10 is a block diagram showing one example of a configuration of an object management system according to a second embodiment.

In FIG. 10, the object operation system in the second embodiment includes at least the object management apparatus 100 and the mobile terminal 200 communicably connected via the network 300. The configuration of the mobile terminal 200 in the second embodiment will be explained first and then, that of the object management apparatus 100 in the second embodiment will be explained.

Configuration of the Mobile Terminal 200 in the Second Embodiment

In FIG. 10, the mobile terminal 200 is communicably connected to the object management apparatus 100 and at least one of the operation target devices 10-1 to 3 via the network 300 and schematically includes a control unit 202 such as a CPU that controls the whole mobile terminal 200 in a unified fashion, a communication device (not shown) such as an antenna that realizes network communication (for example, Internet communication via a communication line such as by radio), a communication control interface 204 connected to a radio communication unit (not shown) to realize short distance communication (for example, communication by electric waves, infrared rays, IrDA, Bluetooth (registered trademark)), an input/output control interface 208 connected to an input unit (not shown) such as a key input unit, touch panel, and microphone, an output unit (not shown) such as a speaker, the displacement detecting unit 20 such as a three-axis acceleration sensor, the image photographing unit 216 such as a CCD camera, and the display unit 214 such as a display, and the storage unit 206 that stores databases and tables of data and programs used to perform various processing, and each of these units is communicably connected via any communication path. Here, the network 300 has a function to mutually connect the object management apparatus 100, other mobile terminals (not shown), and the external devices (not shown) and may be, for example, the Internet, a telephone network (including a mobile terminal network and a general telephone network), or an intranet.

Explanations about the display unit 214, the displacement detecting unit 20, and the image photographing unit 216 of the mobile terminal 200 are the same as those in the first embodiment and thus are omitted.

In FIG. 6, the various databases and tables (such as a display object database 206a, an operation target object table 206b, a processing command table 206c, and an operation command table 206d) stored in the storage unit 206 of the mobile terminal 200 are storage units such as fixed disk devices, and store various programs, various tables, various databases, various file, and the like used in various processes.

Among components of the storage unit 206, explanations about the display object database 206a and the operation command table 206d are the same as those about the display object database 106a and the operation command table 106d of the object management apparatus 100 in the first embodiment and thus are omitted.

An operation target object table 206b is an operation target object storing unit that stores image data corresponding to the operation target device 10, which is a device (for example, a FAX, scanner, external storage device) such as a PC peripheral operated by the object management apparatus 100, as an operation target object. Here, an operation target object may contain characteristic information to determine at least one of a character, symbol, figure, photo, and model to identify the operation target device 10 corresponding to the operation target object.

A processing command table 206c is a processing command storing unit that associates and stores an operation target object, a displacement of a physical quantity of the mobile terminal 200, and a processing command specifying processing to be performed on the operation target device 10 using a display object. The processing command table 206c is a processing command storing unit that associates and stores image data containing characteristic information to determine an operation target object acquired in advance by performing pattern recognition processing or the like based on an image photographed by the image photographing unit 216 following a user's operation, a displacement of a physical quantity of the mobile terminal 200 input in advance as numeric information (for example, a numeric value representing a displacement of a physical quantity when the user holds up the mobile terminal 200 backward or pulls toward you) or the like by the user via the input unit such as a keyboard, and a processing command specifying processing to be performed on the operation target device 10 using a display object, which is image data or the like corresponding to processing data acquired in advance by the user as described above.

In FIG. 10, the control unit 202 of the mobile terminal 200 includes an internal memory that stores a control program such as an operating system (OS), programs specifying various processing procedures, and necessary data and performs information processing for executing various pieces of processing by using these programs. The control unit 202 functionally and conceptually includes a display object displaying unit 202a, an operation target object extracting unit 202b, a matching determining unit 202c, an operation target object determining unit 202d, a processing command determining physical quantity displacement detecting unit 202e, a display object acquiring unit 202f, a processing command searching unit 202g, a processing command executing unit 202h, an operation command determining physical quantity displacement detecting unit 202i, an operation command searching unit 202j, an operation command executing unit 202k, and an image processing unit 202m.

Out of these units, the display object displaying unit 202a displays the display object stored in the display object database 206a on the display unit 214.

The operation target object extracting unit 202b extracts, based on at least a portion of images on a work plane photographed by the image photographing unit 216 and in which the operation target object is displayed in the specific region, the operation target object in the images (for example, the characteristic information of the operation target is determined by such as a pattern recognition processing). Here, the operation target object extracting unit 202b may extract the operation target object in the image based on the image after the projective transformation on which image processing is performed by the image processing unit 202m. Also, the operation target object extracting unit 202b may extract the operation target object from at least one of the image in which the operation target object is displayed in the specific region on the work plane, based on the characteristic information.

The matching determining unit 202c determines whether two operation target objects match by comparing the operation target object (for example, the characteristic information of the extracted operation target object) extracted by the operation target object extracting unit 202b and the operation target object (for example, the characteristic information of the stored operation target object) stored in the operation target object table 206b.

The operation target object determining unit 202d determines the matched operation target object from the operation target object table 206b (for example, the characteristic information of the operation target is determined by such as a pattern recognition processing), after being determined by the matching determining unit 202c that the two operation target objects match (for example, the characteristic information of the two operation target objects match within the predetermined range).

The processing command determining physical quantity displacement detecting unit 202e detects the displacement of the physical quantity by the displacement detecting unit 20 after the operation target object being determined by the operation target object determining unit 202d.

The display object acquiring unit 202f acquires the display object displayed on the display unit 214 by the display object displaying unit 202a from the display object database 206a when the displacement of the physical quantity is detected by the processing command determining physical quantity displacement detecting unit 202e.

The processing command searching unit 202g searches for the processing command associated with the operation target object and the displacement of the physical quantity from the processing command table 206c using the operation target object (for example, the characteristic information of the operation target object) determined by the operation target object determining unit 202d and the displacement of the physical quantity detected by the processing command determining physical quantity displacement detecting unit 202e as search keys.

The processing command executing unit 202h causes the operation target device 10 corresponding to the operation target object determined by the operation target object determining unit 202d to execute the processing command searched for by the processing command searching unit 202g using the display object acquired by the display object acquiring unit 202f.

The operation command determining physical quantity displacement detecting unit 202i detects the displacement of the physical quantity by the displacement detecting unit 20 after being determined by the matching determining unit 202c that the two operation target objects do not match.

The operation command searching unit 202j searches for the operation command associated with the displacement of the physical quantity from the operation command table 206d using the displacement of the physical quantity detected by the operation command determining physical quantity displacement detecting unit 202i as the search key.

The operation command executing unit 202k executes the operation command searched for by the operation command searching unit 202j on the display object.

The image processing unit 202m performs image processing on the image acquired by the image photographing unit 216 so that the image becomes an image photographed from a front direction by performing projective transformation.

The explanation about the projective transformation performed by an image processing unit 202m of the mobile terminal 200 in the second embodiment is the same as that about the projective transformation performed by the image processing unit 102m of the object management apparatus in the first embodiment and thus is omitted.

Configuration of the Object Management Apparatus 100 in the Second Embodiment

In FIG. 10, the object management apparatus 100 is communicably connected to the mobile terminal 200 and at least one of the operation target devices 10-1 to 3 (for example, a FAX, scanner, external storage device or the like) via the network 300. That is, in the second embodiment, the object management apparatus 100 is configured in such a way that processing specified by the processing command determined by the mobile terminal 200 is performed on the controllably connected operation target devices 10-1 to 3.

Here, the hardware configuration of the object management apparatus 100 in the second embodiment may be set up by using commercially available information processing devices such as workstations and personal computers and attachment devices thereof. Each function of the object management apparatus 100 is realized by the CPU, disk device, memory device, input device, output device, and communication control device in the hardware configuration of the object management apparatus 100, and program to control these components.

Processing of the Object Management System in the Second Embodiment

Subsequently, an example of processing of the object management system in the second embodiment will be explained below with reference to FIG. 11.

Figure 11:
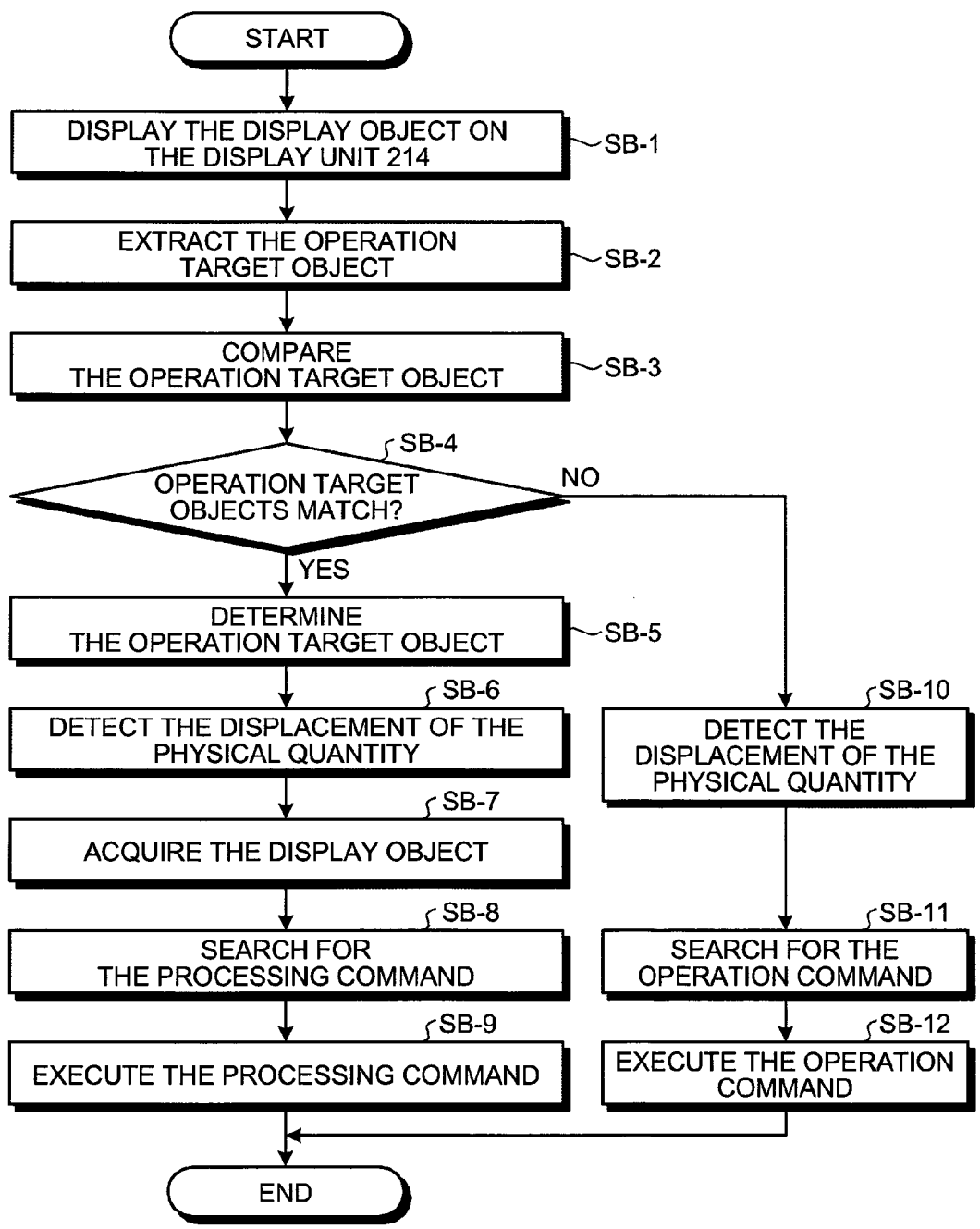
FIG. 11 is a flowchart showing one example of detail of an object management processing of the object management system according to the embodiment.

As shown in FIG. 11, the display object displaying unit 202a of the mobile terminal 200 displays the display object stored in the display object database 206a on the display unit 214 (step SB-1).

The operation target object extracting unit 202b of the mobile terminal 200 extracts, based on at least a portion of images on a work plane photographed by the image photographing unit 216 and in which the operation target object is displayed in the specific region, the operation target object in the images (for example, the characteristic information of the operation target is determined by such as a pattern recognition processing) (step SB-2). Here, the operation target object extracting unit 202b may extract the operation target object in the image based on the image after the projective transformation on which image processing is performed by the image processing unit 202m. Also, the operation target object extracting unit 202b may extract the operation target object from at least one of the image in which the operation target object is displayed in the specific region on the work plane, based on the characteristic information.

The matching determining unit 202c of the mobile terminal 200 compares the operation target object (for example, the characteristic information of the extracted operation target object) extracted by the operation target object extracting unit 202b and the operation target object (for example, the characteristic information of the stored operation target object) stored in the operation target object table 206b (step SB-3).

The matching determining unit 202c of the mobile terminal 200 determines whether two operation target objects match based on the compared result at the step SB-3 (step SB-4).

After being determined by the matching determining unit 202c that the two operation target objects match (for example, the characteristic information of the two operation target objects match within the predetermined range) (step SB-4: Yes), the operation target object determining unit 202d of the mobile terminal 200 determines the matched operation target object from the operation target object table 206b (for example, the characteristic information of the operation target is determined by such as a pattern recognition processing) (step SB-5).

The processing command determining physical quantity displacement detecting unit 202e of the mobile terminal 200 detects the displacement of the physical quantity by the displacement detecting unit 20 after the operation target object being determined by the operation target object determining unit 202d (step SB-6).

The display object acquiring unit 202f of the mobile terminal 200 acquires the display object displayed on the display unit 214 by the display object displaying unit 202a from the display object database 206a when the displacement of the physical quantity is detected by the processing command determining physical quantity displacement detecting unit 202e (step SB-7).

The processing command searching unit 202g of the mobile terminal 200 searches for the processing command associated with the operation target object and the displacement of the physical quantity from the processing command table 206c using the operation target object (for example, the characteristic information of the operation target object) determined by the operation target object determining unit 202d and the displacement of the physical quantity detected by the processing command determining physical quantity displacement detecting unit 202e as search keys (step SB-8).

The processing command executing unit 202h of the mobile terminal 200 causes the operation target device 10 corresponding to the operation target object determined by the operation target object determining unit 202d to execute the processing command searched for by the processing command searching unit 202g using the display object acquired by the display object acquiring unit 202f (step SB-9).

Referring back to step SB-4 in FIG. 11, after being determined by the matching determining unit 202c that the two operation target objects do not match (step SB-4: No), the operation command determining physical quantity displacement detecting unit 202i of the mobile terminal 200 detects the displacement of the physical quantity by the displacement detecting unit 20 (step SB-10).

The operation command searching unit 202j of the mobile terminal 200 searches for the operation command associated with the displacement of the physical quantity from the operation command table 206d using the displacement of the physical quantity detected by the operation command determining physical quantity displacement detecting unit 202i as the search key (step SB-11).

The operation command executing unit 202k of the mobile terminal 200 executes the operation command searched for by the operation command searching unit 202j on the display object (step SB-12).

Other Embodiments

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the object management apparatus 100 and the mobile terminal 200 are merely conceptual and may not necessarily physically resemble the structures shown in the drawings. For instance, the apparatus need not necessarily have the structure that is illustrated.

For example, the process functions performed by each device of the object management apparatus 100 and the mobile terminal 200, especially the each process function performed by the control unit 102, 202, can be entirely or partially realized by a central processing unit (CPU) and a computer program executed by the CPU or by a hardware using wired logic. The computer program, recorded on a recording medium to be described later, can be mechanically read by the object management apparatus 100 and the mobile terminal 200 as the situation demands. In other words, the storage unit 106, 206 such as read-only memory (ROM) or hard disk (HD) stores the computer program that can work in coordination with the operating system (OS) to issue commands to the CPU and cause the CPU to perform various processes. The computer program is first loaded to the random access memory (RAM), and forms a control unit in collaboration with the CPU.

Alternatively, the computer program can be stored in any application program server connected to the object management apparatus 100 and the mobile terminal 200 via the network 300, and can be fully or partially loaded as the situation demands.

The computer-readable recording medium on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over networks such as local area network (LAN), wide area network (WAN), and the Internet.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

The storage unit 106, 206 are fixed disk devices such as RAM, ROM, and hard disk or flexible disk, optical disk, and store therein various programs, tables, databases (such as a display object database 106a, 206a, an operation target object table 106b, 206b, a processing command table 106c, 206c, and an operation command table 106d, 206d), and files required for various processes.

The object management apparatus 100 can also be connected to any existing personal computer, workstation, etc. and can be operated by executing software (that includes computer program, data, etc.) that implements the method according to the present invention in the personal computer or workstation.

The distribution and integration of the device are not limited to those illustrated in the figures. The device as a whole or in parts can be functionally or physically distributed or integrated in an arbitrary unit according to various attachments or how the device is to be used.

According to the present invention, an effect of being able to determine and execute a processing command specifying processing (for example, viewing received data of FAX, transmitting processing data by FAX) performed using a display object (processing data such as image data) transmitted to the mobile terminal and displayed on the display unit in real time based on a displacement of a physical quantity (such as acceleration) received after being detected by the displacement detecting unit of the mobile terminal is achieved in the object management apparatus by an operation target object being selected after the mobile terminal being held up over the operation target object (an operation target device such as a FAX) desired by the user and a predetermined operation (for example, pulling the mobile terminal toward you or holding up the mobile terminal backward) being performed by the user using the mobile terminal over the selected operation target object.

Therefore, while it is conventionally necessary to prepare devices for generating and projecting an object and a work plane for projection, leading to expansion of a facility itself, the present invention eliminates the need for preparations of a generation device and projection device of an object, a work plane for projection and the like and an effect of being able to miniaturize the apparatus is achieved by using a mobile terminal as an input unit through which a displacement of a physical quantity is caused to input and also as a display unit caused to display a display object. Also, while a user operation (for example, a drag-and-drop operation) on an object is conventionally recognized by detecting a change in position of the object on the work plane for projection by a plurality of cameras installed in the apparatus and thus it results in a heavy load of the processing content determination processing and processing content desired by the user cannot be determined and executed in real time, the present invention eliminates the need for detection of a change in position of an object using the cameras and an effect of being able to reduce the load of determination processing of processing content and to determine and execute processing content desired by the user in real time is achieved by performing determination processing of processing content based on a displacement of a physical quantity received after being detected by a displacement detecting unit of the mobile terminal.

According to the present invention, an effect of being able to determine an operation on a display object based on a displacement of a physical quantity (such as acceleration) received after being detected by a displacement detecting unit of the mobile terminal is achieved in the object management apparatus by a predetermined operation (for example, an operation of swinging the mobile terminal from side to side while pressing a predetermined key) being performed by the user using the mobile terminal outside a region over an operation target object (for example, an operation target device such as a FAX). Therefore, the present invention achieves an effect of being able to search for and execute an operation command specifying operation processing by distinguishing a displacement of a physical quantity detected in a region over an operation target object and that detected in other regions. More specifically, according to the present invention, for example, processing content can be determined in two steps of determining a transmission destination of FAX by swinging the mobile terminal from side to side while pressing a predetermined key outside a region over an object (step 1) and transmitting FAX to the transmission destination determined at step 1 by holding up the mobile terminal backward in a region over the object (step 2) and an effect of being able to expand the scope of selection of processing desired by the user is achieved.

According to the present invention, an effect of being able to switch the display screen is achieved by extracting another display object that is different from the display object (for example, processing data such as image data) displayed on the display unit of the mobile terminal based on a displacement of a physical quantity (such as acceleration) received after being detected by a displacement detecting unit of the mobile terminal in the object management apparatus by a predetermined operation (for example, an operation of swinging the mobile terminal from side to side) being performed by the user using the mobile terminal outside a region over an operation target object (for example, a specific folder) and transmitting the extracted display object to the mobile terminal to cause the display unit to newly display the display object. Therefore, according to the present invention, processing on an operation target device using a display object can be determined while confirming the display object displayed in the display unit of the mobile terminal and an effect of being able to reduce operation mistakes is achieved. More specifically, the present invention achieves an effect of being able to execute processing commands such as determining a display object (for example, processing data such as image data) desired by the user by swinging the mobile terminal from side to side outside an region over an object and storing the determined display object in a selected operation target object (for example, a specific folder) by holding up the mobile terminal backward in an region over the object.

According to the present invention, an effect of being able to determine processing efficiently in a short time by performing a predetermined operation such as swinging the mobile terminal vertically or horizontally by holding the mobile terminal with one hand without the need for input of processing desired by the user via the input unit such as a keyboard and touch panel is achieved. That is, according to the present invention, movement of the mobile terminal in three-axis directions can be detected and an effect of being able to improve operability such as adding variation to input processing to the mobile terminal performed based on a displacement of a physical quantity when compared with other sensors such as a uniaxial acceleration sensor is achieved.

According to the present invention, an effect of being able to correctly acquire a spatial relationship between the mobile terminal held by the user and an operation target object is achieved when the position of the mobile terminal is acquired even if the image is an image of the operation target object or the mobile terminal photographed in an oblique direction by an image photographing unit.

According to the present invention, it becomes possible to automatically extract a specific region where an operation target object displayed on the work plane is present based on characteristic information by using an image processing technology such as image recognition so that an effect of being able to automatically update an operation target object storing unit of the storage unit is achieved. That is, it is conventionally necessary to generate a virtual object and project the generated object on a wall, table and the like to construct a virtual integrated desktop, requiring a time to prepare a work space. According to the present invention, however, there is no need to generate and project an object and thus an effect of being able to prepare a work space efficiently in a short time by arranging simple objects such as a character, symbol, figure, photo, and model representing an operation target device on the work plane such as a desk is achieved.

According to the present invention, an effect of being able to determine and execute a processing command specifying processing (for example, viewing received data of FAX, transmitting processing data by FAX) performed using a display object (processing data such as image data) displayed on the display unit in real time based on a displacement of a physical quantity (such as acceleration) detected by the displacement detecting unit is achieved in the mobile terminal by an operation target object being recognized and selected by an image photographing unit contained in the mobile terminal after the mobile terminal being held up over the operation target object (an operation target device such as a FAX) desired by the user and a predetermined operation (for example, pulling the mobile terminal toward you or holding up the mobile terminal backward) being performed by the user using the mobile terminal over the selected operation target object.

Therefore, while it is conventionally necessary to prepare devices for generating and projecting an object and a work plane for projection, leading to expansion of a facility itself, the present invention eliminates the need for preparations of a generation device and projection device of an object, a work plane for projection and the like and an effect of being able to miniaturize the apparatus is achieved by using a mobile terminal as an input unit through which a displacement of a physical quantity is caused to input and also as a display unit caused to display a display object. Also, while a user operation (for example, a drag-and-drop operation) on an object is conventionally recognized by detecting a change in position of the object on the work plane for projection by the cameras installed in the apparatus and thus it results in a heavy load of the processing content determination processing and processing content desired by the user cannot be determined and executed in real time, the present invention eliminates the need for detection of a change in position of an object using the cameras and an effect of being able to reduce the load of determination processing of processing content and to determine and execute processing content desired by the user in real time is achieved by performing determination processing of processing content based on a displacement of a physical quantity received after being detected by the displacement detecting unit of the mobile terminal.

According to the present invention, an effect of being able to determine operation processing on a display object based on a displacement of a physical quantity (such as acceleration) detected by the displacement detecting unit is achieved in the mobile terminal by a predetermined operation (for example, an operation of swinging the mobile terminal from side to side) being performed by the user using the mobile terminal outside a region over an operation target object (for example, an operation target device such as a FAX). Therefore, the present invention achieves an effect of being able to search for and execute an operation command specifying operation processing by distinguishing a displacement of a physical quantity detected in a region over an operation target object and that detected in other regions. More specifically, according to the present invention, for example, operation processing can be determined in two steps of selecting desired data from received data of FAX, for example, by swinging the mobile terminal from side to side outside a region over an object (step 1) and receiving data selected at step 1 by the mobile terminal from FAX by pulling the mobile terminal toward you in a region over the object (step 2) and an effect of being able to expand the scope of selection of processing desired by the user is achieved.

According to the present invention, an effect of being able to switch the display screen is achieved by extracting, from the storage unit, another display object that is different from the display object (for example, processing data such as image data) displayed on the display unit based on a displacement of a physical quantity (such as acceleration) detected by the displacement detecting unit in the mobile terminal by a predetermined operation (for example, an operation of swinging the mobile terminal from side to side) being performed by the user using the mobile terminal outside a region over an operation target object (for example, an operation target device such as a FAX) and transmitting the extracted display object to the mobile terminal to cause the display unit to newly display the display object. Therefore, according to the present invention, processing on an operation target device using a display object can be determined while confirming the display object displayed on the display unit of the mobile terminal and an effect of being able to reduce operation mistakes is achieved. More specifically, the present invention achieves an effect of being able to perform operation processing such as determining a display object (for example, processing data such as image data) desired by the user by swinging the mobile terminal from side to side outside a region over an object and receiving the determined display object by the mobile terminal from a selected operation target object (for example, an operation target device such as a FAX) by pulling the mobile terminal toward you in an region over the object.

According to the present invention, an effect of being able to determine processing efficiently in a short time by performing a predetermined operation such as swinging the mobile terminal vertically or horizontally by holding the mobile terminal with one hand without the need for input of processing desired by the user via the input unit such as a keyboard and touch panel is achieved. That is, according to the present invention, movement of the mobile terminal in three-axis directions can be detected and an effect of being able to improve operability such as adding variation to input processing to the mobile terminal performed based on a displacement of a physical quantity when compared with other sensors such as a uniaxial acceleration sensor is achieved.

According to the present invention, an effect of being able to correctly extract an operation target object is achieved when a display object is extracted even if the image is an image of the operation target object photographed in an oblique direction by an image photographing unit.

According to the present invention, an effect of being able to automatically extract an operation target object displayed on the work plane based on characteristic information by using an image processing technology such as image recognition is achieved. That is, it is conventionally necessary to generate a virtual object and project the generated object on a wall, table and the like to construct a virtual integrated desktop, requiring a time to prepare a work space. According to the present invention, however, there is no need to generate and project an object and thus an effect of being able to prepare a work space efficiently in a short time by arranging simple objects such as a character, symbol, figure, photo, and model representing an operation target device on the work plane such as a desk is achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An object management apparatus comprising an image photographing unit, a storage unit, and a control unit communicably connected to at least one operation target device and a mobile terminal including a displacement detecting unit that detects a displacement of a physical quantity caused when the mobile terminal moves and a display unit via a network, wherein the storage unit includes:
a display object storing unit that stores a display object corresponding to processing data;
an operation target object storing unit that associates and stores an operation target object corresponding to the operation target device and a specific region on a work plane where the operation target object is present; and
a processing command storing unit that associates and stores position information of the mobile terminal, the displacement of the physical quantity of the mobile terminal, and a processing command for specifying processing to be performed on the operation target device using the display object, and the control unit includes:
a display object transmitting unit that transmits the display object stored in the display object storing unit to the mobile terminal to cause the display unit to display the display object;
a mobile terminal position acquiring unit that acquires the position information of the mobile terminal on the work plane by comparing a first image on the work plane photographed by the image photographing unit and in which the operation target object is displayed in the specific region and a second image in which the mobile terminal is displayed on the work plane;
an region determining unit that determines whether the position information is included in the specific region by comparing the position information of the mobile terminal acquired by the mobile terminal position acquiring unit and the specific region of the operation target object stored in the operation target object storing unit;
an operation target object determining unit that determines the operation target object associated with the specific region from the operation target object storing unit when the region determining unit determines that the position information is included in the specific region;
a processing command determining physical quantity displacement receiving unit that receives the displacement of the physical quantity detected by the displacement detecting unit of the mobile terminal from the mobile terminal after the operation target object being determined by the operation target object determining unit;
a display object acquiring unit that acquires the display object transmitted to the mobile terminal by the display object transmitting unit and displayed on the display unit from the display object storing unit when the displacement of the physical quantity is received by the processing command determining physical quantity displacement receiving unit;
a processing command searching unit that searches for the processing command associated with the position information and the displacement of the physical quantity from the processing command storing unit using the position information of the mobile terminal acquired by the mobile terminal position acquiring unit and the displacement of the physical quantity received by the processing command determining physical quantity displacement receiving unit as search keys; and
a processing command executing unit that causes the operation target device corresponding to the operation target object determined by the operation target object determining unit to execute the processing command searched for by the processing command searching unit using the display object acquired by the display object acquiring unit.

2. The object management apparatus according to claim 1, wherein
the storing unit further includes:
an operation command storing unit that associates and stores the displacement of the physical quantity of the mobile terminal and an operation command for specifying operation processing on the display object displayed on the display unit of the mobile terminal, and
the control unit further includes:
an operation command determining physical quantity displacement receiving unit that receives the displacement of the physical quantity detected by the displacement detecting unit of the mobile terminal from the mobile terminal after being determined by the region determining unit that the position information is not included in the specific region;
an operation command searching unit that searches for the operation command associated with the displacement of the physical quantity from the operation command storing unit using the displacement of the physical quantity received by the operation command determining physical quantity displacement receiving unit as the search key; and
an operation command executing unit that executes the operation command searched for by the operation command searching unit on the display object.

3. The object management apparatus according to claim 2, wherein
the operation command specifies operation processing to extract, from the display object storing unit, another display object that is different from the display object displayed on the display unit of the mobile terminal and to transmit the extracted display object to the mobile terminal to cause the display unit to display the display object according to the displacement of the physical quantity of the mobile terminal.

4. The object management apparatus according to claim 1, wherein
the displacement detecting unit of the mobile terminal is a three-axis acceleration sensor and the physical quantity includes gravitational acceleration or acceleration.

5. The object management apparatus according to claim 1, wherein
the control unit further includes:
an image processing unit that performs image processing on the first image and the second image acquired by the image photographing unit so that the first image and the second image become images photographed from a front direction by performing projective transformation, wherein
the mobile terminal position acquiring unit
acquires the position information of the mobile terminal on the work plane by comparing the first image and the second image after the projective transformation on which image processing is performed by the image processing unit.

6. The object management apparatus according to claim 1, wherein
the operation target object contains characteristic information to determine at least one of a character, symbol, figure, photo, or model to identify the operation target device corresponding to the operation target object, wherein
the control unit further includes:
a specific region extracting unit that extracts the specific region on the work plane where the operation target object is present from the first image based on the characteristic information to associate the operation target object and the specific region extracted by the specific region extracting unit and to store the associated operation target object and the associated specific region in the operation target object storing unit.

7. A mobile terminal communicably connected to at least one operation target device and an object management apparatus via a network and comprising a displacement detecting unit that detects a displacement of a physical quantity caused when the mobile terminal moves, a display unit, an image photographing unit, a storage unit, and a control unit, wherein
the storage unit includes:
a display object storing unit that stores a display object corresponding to processing data;
an operation target object storing unit that stores an operation target object corresponding to the operation target device; and
a processing command storing unit that associates and stores the operation target object, the displacement of the physical quantity of the mobile terminal, and a processing command for specifying processing to be performed on the operation target device using the display object, and
the control unit includes:
a display object displaying unit that displays the display object stored in the display object storing unit on the display unit;
an operation target object extracting unit that extracts, based on at least a portion of images on a work plane photographed by the image photographing unit and in which the operation target object is displayed in the specific region, the operation target object in the images;
a matching determining unit that determines whether two operation target objects match by comparing the operation target object extracted by the operation target object extracting unit and the operation target object stored in the operation target object storing unit;
an operation target object determining unit that determines the matched operation target object from the operation target object storing unit after being determined by the matching determining unit that the two operation target objects match;
a processing command determining physical quantity displacement detecting unit that detects the displacement of the physical quantity by the displacement detecting unit after the operation target object being determined by the operation target object determining unit;
a display object acquiring unit that acquires the display object displayed on the display unit by the display object displaying unit from the display object storing unit when the displacement of the physical quantity is detected by the processing command determining physical quantity displacement detecting unit;
a processing command searching unit that searches for the processing command associated with the operation target object and the displacement of the physical quantity from the processing command storing unit using the operation target object determined by the operation target object determining unit and the displacement of the physical quantity detected by the processing command determining physical quantity displacement detecting unit as search keys; and a processing command executing unit that causes the operation target device corresponding to the operation target object determined by the operation target object determining unit to execute the processing command searched for by the processing command searching unit using the display object acquired by the display object acquiring unit.

8. The mobile terminal according to claim 7, wherein
the storing unit further includes:
an operation command storing unit that associates and stores the displacement of the physical quantity of the mobile terminal and an operation command for specifying operation processing on the display object displayed on the display unit of the mobile terminal, and
the control unit further includes:
an operation command determining physical quantity displacement detecting unit that detects the displacement of the physical quantity by the displacement detecting unit after being determined by the matching determining unit that the two operation target objects do not match;
an operation command searching unit that searches for the operation command associated with the displacement of the physical quantity from the operation command storing unit using the displacement of the physical quantity detected by the operation command determining physical quantity displacement detecting unit as the search key; and
an operation command executing unit that executes the operation command searched for by the operation command searching unit on the display object.

9. The mobile terminal according to claim 8, wherein the operation command specifies operation processing to extract, from the display object storing unit, another display object that is different from the display object displayed on the display unit of the mobile terminal and to cause the display unit to display the extracted display object according to the displacement of the physical quantity of the mobile terminal.

10. The mobile terminal according to claim 7, wherein the displacement detecting unit is a three-axis acceleration sensor and the physical quantity includes gravitational acceleration or acceleration.

11. The mobile terminal according to claim 7, wherein
the control unit further includes:
an image processing unit that performs image processing on the image acquired by the image photographing unit so that the image becomes an image photographed from a front direction by performing projective transformation, wherein
the operation target object extracting unit
extracts the operation target object in the image based on the image after the projective transformation on which image processing is performed by the image processing unit.

12. The mobile terminal according to claim 7, wherein
the operation target object contains characteristic information to determine at least one of a character, symbol, figure, photo, or model to identify the operation target device corresponding to the operation target object, wherein
the operation target object extracting unit
extracts the operation target object from the image based on the characteristic information.

13. An object management method executed by an object management apparatus including an image photographing unit, a storage unit, and a control unit communicably connected to at least one operation target device and a mobile terminal including a displacement detecting unit that detects a displacement of a physical quantity caused when the mobile terminal moves and a display unit via a network, wherein
the storage unit includes:
a display object storing unit that stores a display object corresponding to processing data;
an operation target object storing unit that associates and stores an operation target object corresponding to the operation target device and a specific region on a work plane where the operation target object is present; and
a processing command storing unit that associates and stores position information of the mobile terminal, the displacement of the physical quantity of the mobile terminal, and a processing command for specifying processing to be performed on the operation target device using the display object, and
the method comprises:
a display object transmitting step of transmitting the display object stored in the display object storing unit to the mobile terminal to cause the display unit to display the display object;
a mobile terminal position acquiring step of acquiring the position information of the mobile terminal on the work plane by comparing a first image on the work plane photographed by the image photographing unit and in which the operation target object is displayed in the specific region and a second image in which the mobile terminal is displayed on the work plane;
an region determining step of determining whether the position information is included in the specific region by comparing the position information of the mobile terminal acquired at the mobile terminal position acquiring step and the specific region of the operation target object stored in the operation target object storing unit;
an operation target object determining step of determining the operation target object associated with the specific region from the operation target object storing unit after being determined that the position information is included in the specific region at the region determining step;
a processing command determining physical quantity displacement receiving step of receiving the displacement of the physical quantity detected by the displacement detecting unit of the mobile terminal from the mobile terminal after the operation target object being determined at the operation target object determining step;
a display object acquiring step of acquiring the display object transmitted to the mobile terminal at the display object transmitting step and displayed on the display unit from the display object storing unit when the displacement of the physical quantity is received at the processing command determining physical quantity displacement receiving step;
a processing command searching step of searching for the processing command associated with the position information and the displacement of the physical quantity from the processing command storing unit using the position information of the mobile terminal acquired at the mobile terminal position acquiring step and the displacement of the physical quantity received at the processing command determining physical quantity displacement receiving step as search keys; and
a processing command executing step of causing the operation target device corresponding to the operation target object determined at the operation target object determining step to execute the processing command searched for at the processing command searching step using the display object acquired at the display object acquiring step, wherein the steps are executed by the control unit.

14. The object management method according to claim 13, wherein the storing unit further includes:

an operation command storing unit that associates and stores the displacement of the physical quantity of the mobile terminal and an operation command for specifying operation processing on the display object displayed on the display unit of the mobile terminal, and the method further comprises:

an operation command determining physical quantity displacement receiving step of receiving the displacement of the physical quantity detected by the displacement detecting unit of the mobile terminal from the mobile terminal after being determined that the position information is not included in the specific region at the region determining step;

an operation command searching step of searching for the operation command associated with the displacement of the physical quantity from the operation command storing unit using the displacement of the physical quantity received at the operation command determining physical quantity displacement receiving step as the search key; and an operation command executing step of executing the operation command searched for at the operation command searching step on the display object.

15. The object management method according to claim 14, wherein the operation command specifies operation processing to extract, from the display object storing unit, another display object that is different from the display object displayed on the display unit of the mobile terminal and to transmit the extracted display object to the mobile terminal to cause the display unit to display the display object according to the displacement of the physical quantity of the mobile terminal.

16. The object management method according to claim 13, wherein the displacement detecting unit of the mobile terminal is a three-axis acceleration sensor and the physical quantity includes gravitational acceleration or acceleration.

17. The object management method according to claim 13, wherein the method further comprises:

an image processing step of performing image processing on the first image and the second image acquired by the image photographing unit so that the first image and the second image become images photographed from a front direction by performing projective transformation, wherein the mobile terminal position acquiring step includes acquiring the position information of the mobile terminal on the work plane by comparing the first image and the second image after the projective transformation on which image processing is performed at the image processing step.

18. The object management method according to claim 13, wherein the operation target object contains characteristic information to determine at least one of a character, symbol, figure, photo, or model to identify the operation target device corresponding to the operation target object, wherein the method further comprises:

a specific region extracting step of extracting the specific region on the work plane where the operation target object is present from the first image based on the characteristic information to associate the operation target object and the specific region extracted at the specific region extracting step and to store the associated operation target object and the associated specific region in the operation target object storing unit.

19. An object management method executed by a mobile terminal communicably connected to at least one operation target device and an object management apparatus via a network and including a displacement detecting unit that detects a displacement of a physical quantity caused when the mobile terminal moves, a display unit, an image photographing unit, a storage unit, and a control unit, wherein the storage unit includes:

a display object storing unit that stores a display object corresponding to processing data;

an operation target object storing unit that stores an operation target object corresponding to the operation target device; and a processing command storing unit that associates and stores the operation target object, the displacement of the physical quantity of the mobile terminal, and a processing command for specifying processing to be performed on the operation target device using the display object, and the method comprises:

a display object displaying step of displaying the display object stored in the display object storing unit on the display unit;

an operation target object extracting step of extracting, based on at least a portion of images on a work plane photographed by the image photographing unit and in which the operation target object is displayed in the specific region, the operation target object in the images;

a matching determining step of determining whether two operation target objects match by comparing the operation target object extracted at the operation target object extracting step and the operation target object stored in the operation target object storing unit;

an operation target object determining step of determining the matched operation target object from the operation target object storing unit after being determined that the two operation target objects match at the matching determining step;

a processing command determining physical quantity displacement detecting step of detecting the displacement of the physical quantity by the displacement detecting unit after the operation target object being determined at the operation target object determining step;

a display object acquiring step of acquiring the display object displayed on the display unit at the display object displaying step from the display object storing unit when the displacement of the physical quantity is detected at the processing command determining physical quantity displacement detecting step;

a processing command searching step of searching for the processing command associated with the operation target object and the displacement of the physical quantity from the processing command storing unit using the operation target object determined at the operation target object determining step and the displacement of the physical quantity detected at the processing command determining physical quantity displacement detecting step as search keys; and a processing command executing step of causing the operation target device corresponding to the operation target object determined at the operation target object determining step to execute the processing command searched for at the processing command searching step using the display object acquired at the display object acquiring step, wherein the steps are executed by the control unit.

20. The object management method according to claim 19, wherein the storing unit further includes:

an operation command storing unit that associates and stores the displacement of the physical quantity of the mobile terminal and an operation command for specifying operation processing on the display object displayed on the display unit of the mobile terminal, and the method further comprises:

an operation command determining physical quantity displacement detecting step of detecting the displacement of the physical quantity by the displacement detecting unit after being determined that the two operation target objects do not match at the matching determining unit;

an operation command searching step of searching for the operation command associated with the displacement of the physical quantity from the operation command storing unit using the displacement of the physical quantity detected at the operation command determining physical quantity displacement detecting step as the search key; and an operation command executing step of executing the operation command searched for at the operation command searching step on the display object.

21. The object management method according to claim 20, wherein the operation command specifies operation processing to extract, from the display object storing unit, another display object that is different from the display object displayed on the display unit of the mobile terminal and to cause the display unit to display the extracted display object according to the displacement of the physical quantity of the mobile terminal.

22. The object management method according to claim 19, wherein the displacement detecting unit is a three-axis acceleration sensor and the physical quantity includes gravitational acceleration or acceleration.

23. The object management method according to claim 19, wherein the method further comprises:

an image processing step of performing image processing on the image acquired by the image photographing unit so that the image becomes an image photographed from a front direction by performing projective transformation, wherein the operation target object extracting step includes extracting the operation target object in the image based on the image after the projective transformation on which image processing is performed at the image processing step.

24. The object management method according to claim 19, wherein the operation target object contains characteristic information to determine at least one of a character, symbol, figure, photo, or model to identify the operation target device corresponding to the operation target object, wherein the operation target object extracting step includes extracting the operation target object from the image based on the characteristic information.

* * * * *